(12) United States Patent
Isshiki

(10) Patent No.: US 8,564,796 B2
(45) Date of Patent: Oct. 22, 2013

(54) IMAGE PROCESSING METHOD AND APPARATUS FOR PERFORMING NOTIFICATION OF THE PRESENCE OF A FILE WHOSE METADATA IS NOT GENERATED WHEN PERFORMING RETRIEVAL PROCESSING

(75) Inventor: Naohiro Isshiki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 12/434,809

(22) Filed: May 4, 2009

(65) Prior Publication Data

US 2009/0284779 A1 Nov. 19, 2009

(30) Foreign Application Priority Data

May 15, 2008 (JP) ................................. 2008-128792

(51) Int. Cl.
*G06K 15/00* (2006.01)
(52) U.S. Cl.
USPC ........ 358/1.13; 358/1.14; 358/1.15; 707/705; 707/707; 707/711
(58) Field of Classification Search
USPC ........ 358/1.13, 1.14, 1.15; 707/705, 707, 711
See application file for complete search history.

(56) References Cited

U.S. PATENT DOCUMENTS

| 2005/0134906 | A1 | 6/2005 | Takashima | |
| 2006/0085442 | A1* | 4/2006 | Fujiwara | 707/100 |
| 2007/0112844 | A1* | 5/2007 | Tribble et al. | 707/102 |
| 2008/0005088 | A1* | 1/2008 | Yanai | 707/3 |
| 2008/0201636 | A1* | 8/2008 | Fujiwara | 715/700 |

FOREIGN PATENT DOCUMENTS

| CN | 1763747 A | 4/2006 |
| CN | 101097649 A | 1/2008 |
| JP | 2004-215067 | 7/2004 |
| JP | 2005-149061 A | 6/2005 |
| JP | 2006-120125 A | 5/2006 |

OTHER PUBLICATIONS

Notice of the First Office Action issued by the State Intellectual Property Office of the People's Republic of China dated Nov. 12, 2010 in the counterpart application No. 200910140482.X, along with its English-language translation—19 pages.

Japanese Office Action dated Oct. 26, 2012, issued in counterpart Japanese Application No. 2008-128792.

* cited by examiner

*Primary Examiner* — Jacky X Zheng

(74) *Attorney, Agent, or Firm* — Fitzpatrick, Cella, Harper & Scinto

(57) ABSTRACT

A first apparatus, which does not mount any metadata generation unit generating metadata used to specify image data from the image data, and a second apparatus, which mounts the metadata generation unit, are connected via a network in the image processing system. The first apparatus stores image data. The first apparatus requests the second apparatus to generate metadata associated with the stored image data, and the metadata generation unit mounted in the second apparatus generates metadata. The first apparatus requests the second apparatus to retrieve image data using the generated metadata, and a retrieval unit mounted in the second apparatus executes a high-level retrieval.

11 Claims, 21 Drawing Sheets

```
<metadir>
   <metadir_hash> 0x00112233445566778899aabbccddeeff
   <not_created_list>
      <list_entry> job1
   </ not_created_list>
</ metadir>
```

FIG. 13

| | 1301 | 1302 |
|---|---|---|
| 1303 | BOX1 | 192.168.0.50 |
| | BOX2 | 192.168.0.100 |
| | ⋮ | |
| | BOX100 | |

1300

F I G. 16

```
<DocMetadata>
  <Name> Report
  <Box> Box1
  <Docfile> job1
  <Kind> PDL
  <PageNum> 2
  <Data> 2006 / 1 / 1 00 : 00 : 00
  <User> AAA
  <Application> MEMO
  <From> 192.168.1.0
  <PageList>
    <PageMeta> image_ j1_1.pmeta
    <PageMeta> image_ j1_2.pmeta
  < / PageList>
< / DocMetadata>
```

IMAGE PROCESSING METHOD AND APPARATUS FOR PERFORMING NOTIFICATION OF THE PRESENCE OF A FILE WHOSE METADATA IS NOT GENERATED WHEN PERFORMING RETRIEVAL PROCESSING

BACKGROUND OF THE INVENTION

1. Field of the Invention

The present invention relates to an image processing system, an image processing method, an image processing apparatus and a control method thereof. For example, the present invention relates to an image processing method, an image processing apparatus, and an image processing system, which allow a digital apparatus that can store images to retrieve stored images after the apparatus is already deployed and in use.

2. Description of the Related Art

In recent years, a digital multi-function peripheral (digital MFP) functions as an image storage server that stores an input image to allow reuse of the stored image, since it mounts a large-capacity storage device, in addition to performing a copy function, a printer function, a FAX function, a scan function, and the like. In order to implement the image storage server function, conventionally, upon storing an image, that image is saved in a specific mailbox or directory, and the image to be used is specified using its file name by designating the mailbox or directory at the time of reuse of that image.

However, the capacity of the large-capacity storage device mounted in the digital MFP has been increasing, and the amount of images that can be stored is also increasing. As a result of an increase in image amount that can be stored, specifying a stored image by designating the mailbox or directory faces a limit.

In order to solve this problem, as a method of specifying a desired image from those stored in the image storage server, a method of saving text data together with stored images as metadata, and using that metadata in a retrieval process is known. The metadata can be obtained by extracting character information included in an input image by applying a character recognition process to the image (for example, Japanese Patent Laid-Open No. 2004-215067). When a PC or the like notifies the digital MFP of print data as PDL (Page Description Language) data, the PDL data is rasterized to obtain a raster image, and a character recognition process is applied to the raster image to extract character string information.

In recent years, along with the progress of image processing technologies, as another method of specifying a desired image, an image retrieval method of using an image as a retrieval target, and retrieving stored images including those which are similar to the retrieval target image using an image feature amount of that image is also available.

However, a conventional digital MFP which has already been available in the market does not employ any novel technologies, such as technologies that perform generation and retrieval of metadata, and a retrieval using an image feature amount, and can only specify a stored image using a file name or the like, as a conventional method. For this reason, effective use of images stored in MFPs that are already in use is not promoted.

SUMMARY OF THE INVENTION

The present invention has been made to solve the aforementioned problems, and provides an image processing method, an image processing apparatus, and an image processing system, which improve retrievability of images stored in an apparatus that is already in use in the market, and allow effective use of stored images.

According to an aspect of the present invention, there is provided an image processing system in which a first apparatus, which does not mount a metadata generation unit generating metadata used to specify image data from the image data, and a second apparatus, which mounts the metadata generation unit, are connected via a network. The first apparatus comprises: a storage unit adapted to store image data; and a metadata generation request unit adapted to request, via the network, the second apparatus to generate metadata associated with the image data stored in the storage unit. The second apparatus comprises: a metadata generation unit; and a metadata generation service unit adapted to receive the metadata generation request from the metadata generation request unit of the first apparatus via the network, and to instruct the metadata generation unit to generate the metadata associated with the image data stored in the storage unit of the first apparatus.

According to another aspect of the present invention, there is provided an image processing method for an image processing system in which a first apparatus, which does not mount a metadata generation unit generating metadata used to specify image data from the image data, and a second apparatus, which mounts the metadata generation unit are connected via a network. The method comprises: a storage step of the first apparatus storing image data in a storage unit; a metadata generation step of the first apparatus requesting, via the network, the second apparatus to generate metadata associated with the image data stored in the storage unit, and the second apparatus generating the metadata by the metadata generation unit mounted in the second apparatus; and a retrieval step of the first apparatus requesting, via the network, the second apparatus to retrieve image data from the image data stored in the storage unit using the generated metadata, and the second apparatus retrieving image data the generated metadata by a retrieval unit mounted in the second apparatus.

According to still another aspect of the present invention, there is provided an image processing apparatus that does not mount a metadata generation unit generating metadata used to specify image data from the image data. The apparatus comprises a storage unit adapted to store image data; and a metadata generation request unit adapted to request, via a network, an apparatus which mounts a metadata generation unit to generate metadata associated with the image data stored in the storage unit.

According to still another aspect of the present invention, there is provided a method of controlling an image processing apparatus that does not mount a metadata generation unit generating metadata used to specify image data from the image data. The method comprises a storage step of storing image data in a storage unit; a metadata generation request step of requesting, via a network, an apparatus that mounts a metadata generation unit to generate metadata associated with the image data stored in the storage unit; and a retrieval request step of requesting, via the network, an apparatus which mounts a retrieval unit to retrieve image data from the image data stored in the storage unit.

According to yet another aspect of the present invention, there is provided an image processing apparatus that mounts a metadata generation unit generating metadata used to specify image data from the image data. The apparatus comprises a metadata generation unit; and a metadata generation service unit adapted to receive a metadata generation request from an apparatus that does not mount a metadata generation unit via a network, and to instruct the metadata generation unit to generate metadata associated with image data stored in a storage unit of the apparatus that does not mount the metadata generation unit.

According to the present invention, an image processing method, an image processing apparatus, and an image processing system, are provided that can improve retrievability of images stored in an apparatus that has already been deployed and is in use, and allow effective use of stored images.

Further features of the present invention will become apparent from the following description of exemplary embodiments with reference to the attached drawings.

BRIEF DESCRIPTION OF THE DRAWINGS

FIG. 12 is a view showing an example of metadata directory information according to the embodiment;

FIG. 13 is a view showing an example of a requested device table according to the embodiment;

FIG. 16 is a view showing an example of document metadata according to the embodiment;

DETAILED DESCRIPTION OF THE EMBODIMENTS

Embodiments for carrying out the present invention will be described in detail hereinafter with reference to the drawings.

<Arrangement Example of Image Processing System of This Embodiment>

Figure 1:
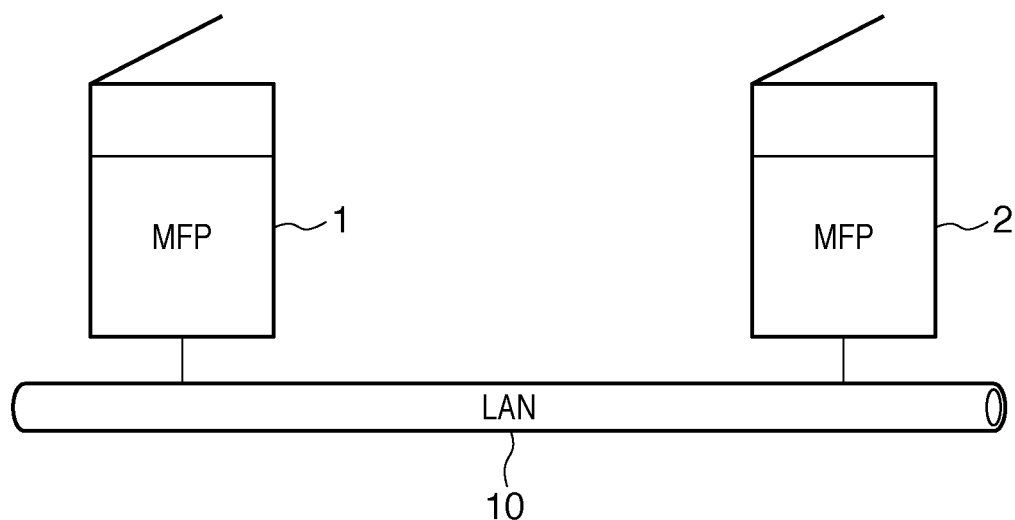
FIG. 1 is a view showing an example of the overall arrangement of an image processing system according to an embodiment of the present invention.

FIG. 1 is a view showing an example of the overall arrangement of an image processing system according to this embodiment.

Color MFPs 1 and 2 are connected to a LAN 10, and can communicate with each other. In this embodiment, the color MFP 1 is a conventional digital MFP which is already deployed and does not have a metadata generation function or high-level retrieval function, and the color MFP 2 is a digital MFP which has a metadata generation function and high-level retrieval function. Note that in this embodiment, the color MFP 1 will be referred to as a first apparatus, and the color MFP 2 will be referred to as a second apparatus hereinafter.

Note that other devices such as a host computer, a printer, and a MFP (not shown) may be connected to the LAN 10. Also, devices that form the image processing system of this embodiment are not limited to the color MFPs, and may be monochrome MFPs or other image processing apparatuses.

<Arrangement Example of Image Processing Apparatus of This Embodiment>

Figure 2:
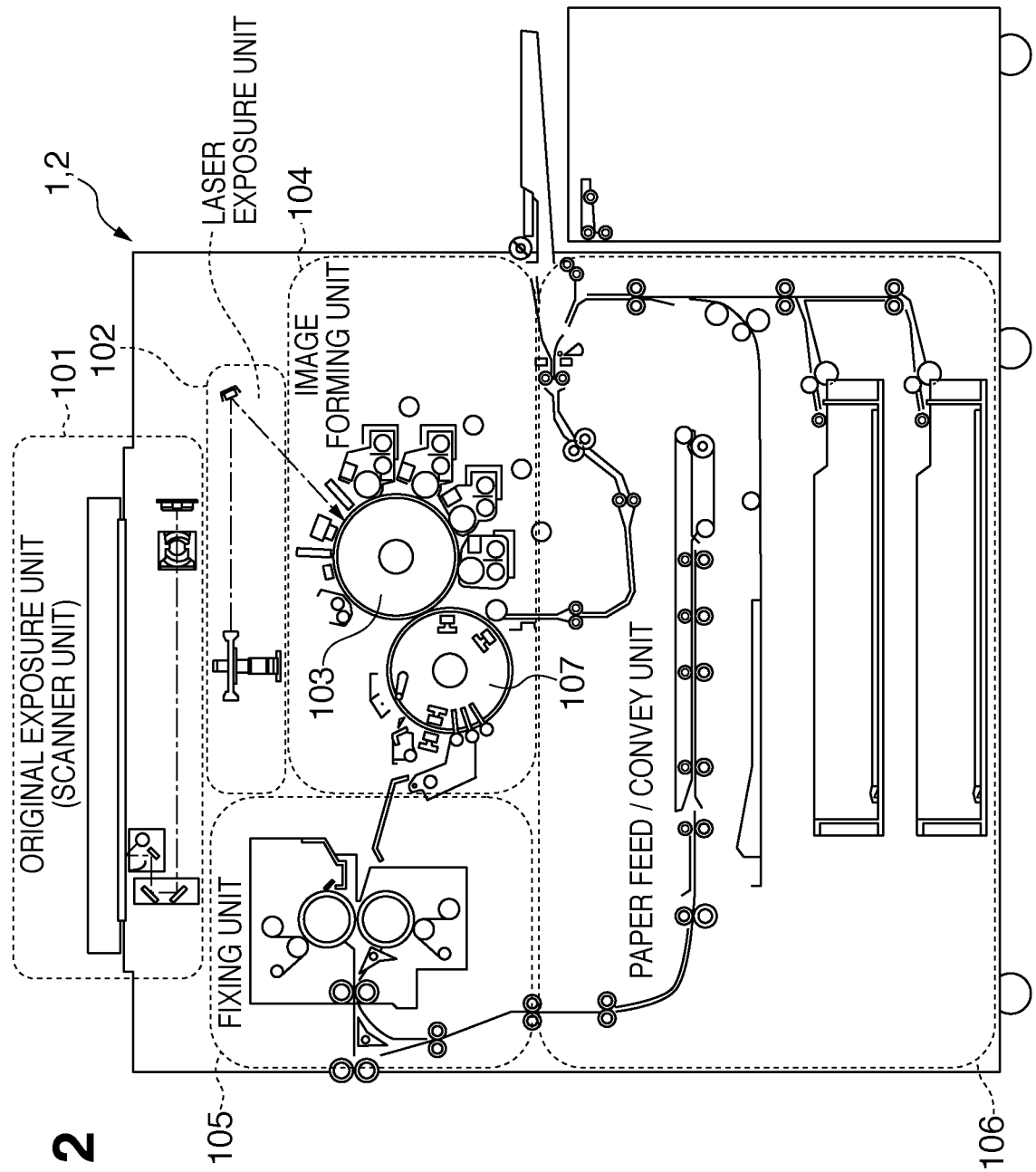
FIG. 2 is a side sectional view showing an example of the structure of color MFPs 1 and 2 according to the embodiment.

The arrangement of a preferred color MFP to which this embodiment is applied will be described below with reference to FIG. 2. A color MFP to be described below is a 1D-type color multi-function peripheral (MFP) which performs color image formation using a single drum.

The 1D-type color MFP includes a scanner unit (original exposure unit in FIG. 2) 101, a laser exposure unit 102, a photosensitive drum 103, an image forming unit 104, a fixing unit 105, a paper feed/convey unit 106, and a printer control unit (not shown) for controlling these units.

The scanner unit 101 optically reads an original image by irradiating the original placed on a platen with light, and converts the optically read image into an electrical signal, thereby generating image data.

The laser exposure unit 102 inputs light rays, such as a laser beam, modulated according to the generated and received image data to a rotary polyhedral mirror (polygon mirror) which rotates at an equal angular velocity, and irradiates the photosensitive drum 103 with reflected scanned light.

The image forming unit 104 forms an image by executing a series of electrophotography processes as follows. The photosensitive drum 103 is rotated and is charged by a charger. A latent image formed on the photosensitive drum 103 by the laser exposure unit 102 is developed by toner. The toner image is transferred onto a sheet. Residual toner which remains on the photosensitive drum 103 without being transferred is recovered. In this case, a sheet is wound around a predetermined position of a transfer drum 107, and is rotated four times. During this period, developing units (developing stations) having magenta (M), cyan (C), yellow (Y), and black (K) toners sequentially execute the aforementioned electrophotography processes in turn. After four rotations, the sheet on which a full-color toner image of four colors is transferred leaves the transfer drum 107, and is conveyed to the fixing unit 105.

The fixing unit 105 is configured by a combination of a roller and a belt, incorporates a heat source such as a halogen heater, and melts and fixes, using heat and pressure, the toner on the sheet on which the toner image is transferred by the image forming unit.

The paper feed/convey unit 106 has at least one sheet storage represented by a sheet cassette or paper deck. In response to an instruction from the printer control unit (not shown), the paper feed/convey unit 106 picks up one of a plurality of sheets stored in the sheet storage, and conveys the sheet from the image forming unit 104 to the fixing unit 105. The sheet is wound around the transfer drum 107 of the image forming unit 104, and is rotated four times. After that, the sheet is conveyed to the fixing unit 105. During the four rotations, toner images of the aforementioned Y, M, C, and K colors are transferred onto the sheet. Upon forming images on both the faces of the sheet, the paper feed/convey unit 106 controls the sheet to make the sheet that has passed the fixing unit 105 pass through a convey path that conveys the sheet to the image forming unit 104 again.

The printer control unit (not shown) communicates with a control unit which controls the overall color MFP, and executes control in response to its instruction. Then, the printer control unit instructs the aforementioned scanner unit, the laser exposure unit, the image forming unit, the fixing unit, and the paper feed/convey unit to smoothly operate in union while managing the states of these units.

<Control Arrangement Example of Color MFP 1>

(Arrangement Example 1 of Control Unit)

Figure 3:
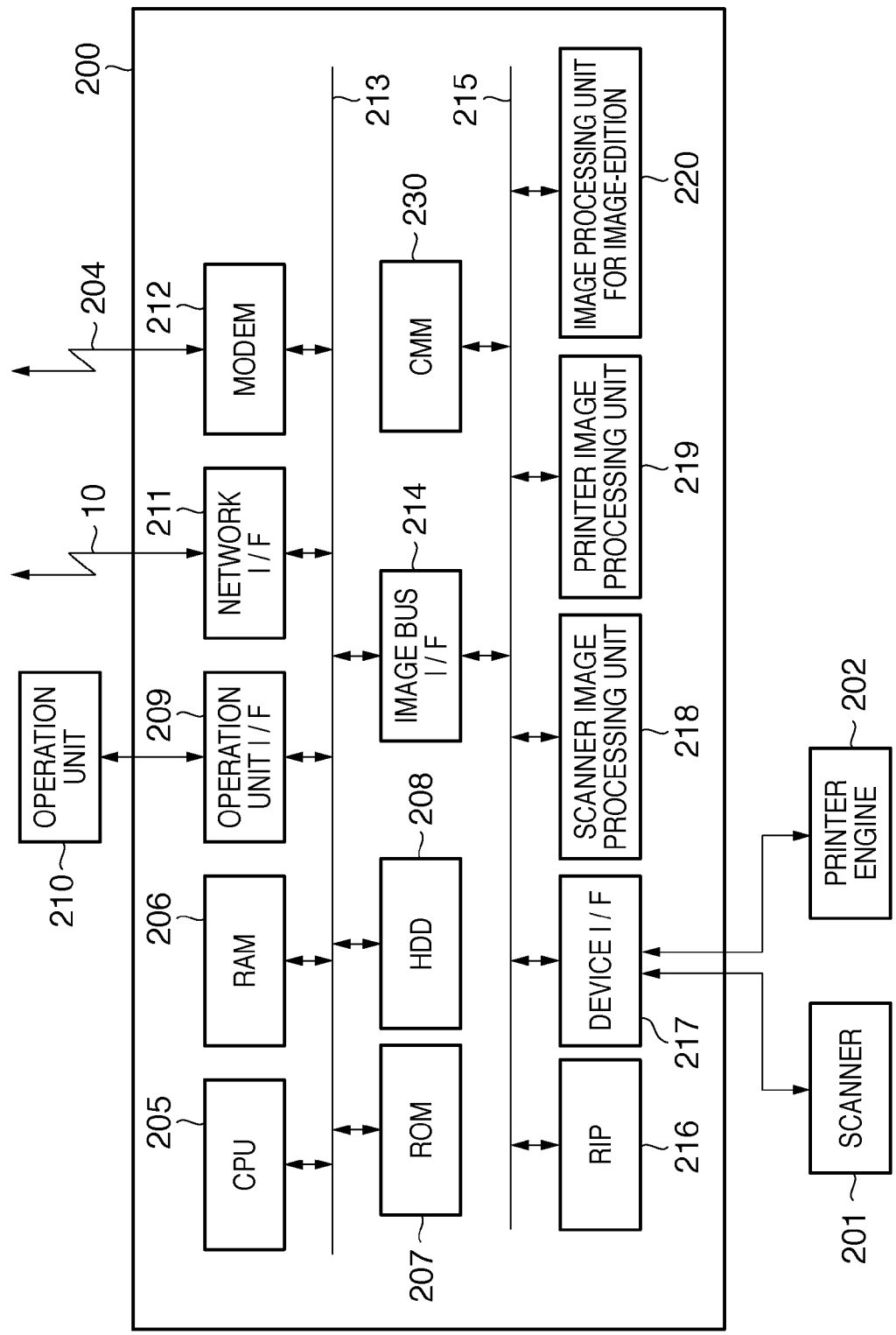
FIG. 3 is a block diagram showing an example of the arrangement of a control unit of the color MFP 1 according to the embodiment.

FIG. 3 is a block diagram showing an example of the arrangement of a control unit (to be also referred to as a controller hereinafter) of the color MFP 1 according to this embodiment.

Referring to FIG. 3, a control unit 200 is connected to a scanner 201 as an image input device and a printer engine 202 as an image output device, and executes control to read image data and to print out an image. The control unit 200 is connected to the LAN 10 and a public line 204 so as to input and output image information and device information via a network.

In the control unit 200 shown in FIG. 3, a CPU 205 is a central processing unit which controls the overall color MFP 1. A RAM 206 is a system work memory required for the CPU 205 to operate, and is also an image memory which temporarily stores input image data. Furthermore, a ROM 207 is a boot ROM, and stores a boot program of the system. An HDD 208 is a hard disk drive, and stores system software for various processes, input image data, document files, and the like.

In FIG. 3, an operation unit I/F 209 is an interface for an operation unit 210 which has a display screen that can display image data and the like, and outputs image data to the operation unit 210. The operation unit I/F 209 plays a role of transferring information input by an operator (that is, the user of this image processing system) from the operation unit 210 to the CPU 205. A network interface 211 is implemented by, for example, a LAN card, and is connected to the LAN 10 to exchange information with an external apparatus. A modem 212 is connected to the public line 204 to exchange information with an external apparatus.

In the control unit 200 according to this embodiment, the aforementioned devices are connected to a system bus 213.

An image bus I/F 214 is an interface which connects the system bus 213 and an image bus 215 which transfers image data at high speed, and serves as a bus bridge that converts a data structure. The image bus 215 includes a PCI bus or IEEE1394. On the image bus 215, devices to be described below, that is, a RIP 216, device I/F 217, a scanner image processing unit 218, a printer image processing unit 219, an image processing unit for image-edition 220, and a color management module (CMM in FIG. 3) 230, are connected.

The raster image processor (RIP) 216 interprets a display list (DL), and generates (renders) a raster image and attribute bits corresponding to respective pixels of the raster image. The device I/F 217 connects the scanner unit 201 and the printer engine 202 with the control unit 200, and carries out synchronous/asynchronous image data conversion.

The scanner image processing unit 218 applies various processes such as correction, modification, and editing to input image data. The printer image processing unit 219 applies processes such as printer correction and resolution conversion to image data to be printed out. The image processing unit for image-edition 220 rotates image data, compresses and decompresses image data, and executes various image processes based on attribute bits generated by the RIP 216. Furthermore, the CMM 230 is a dedicated hardware module which applies a color conversion process to image data based on a profile and calibration data.

(Arrangement Example 1 of Controller Software)

Figure 4:
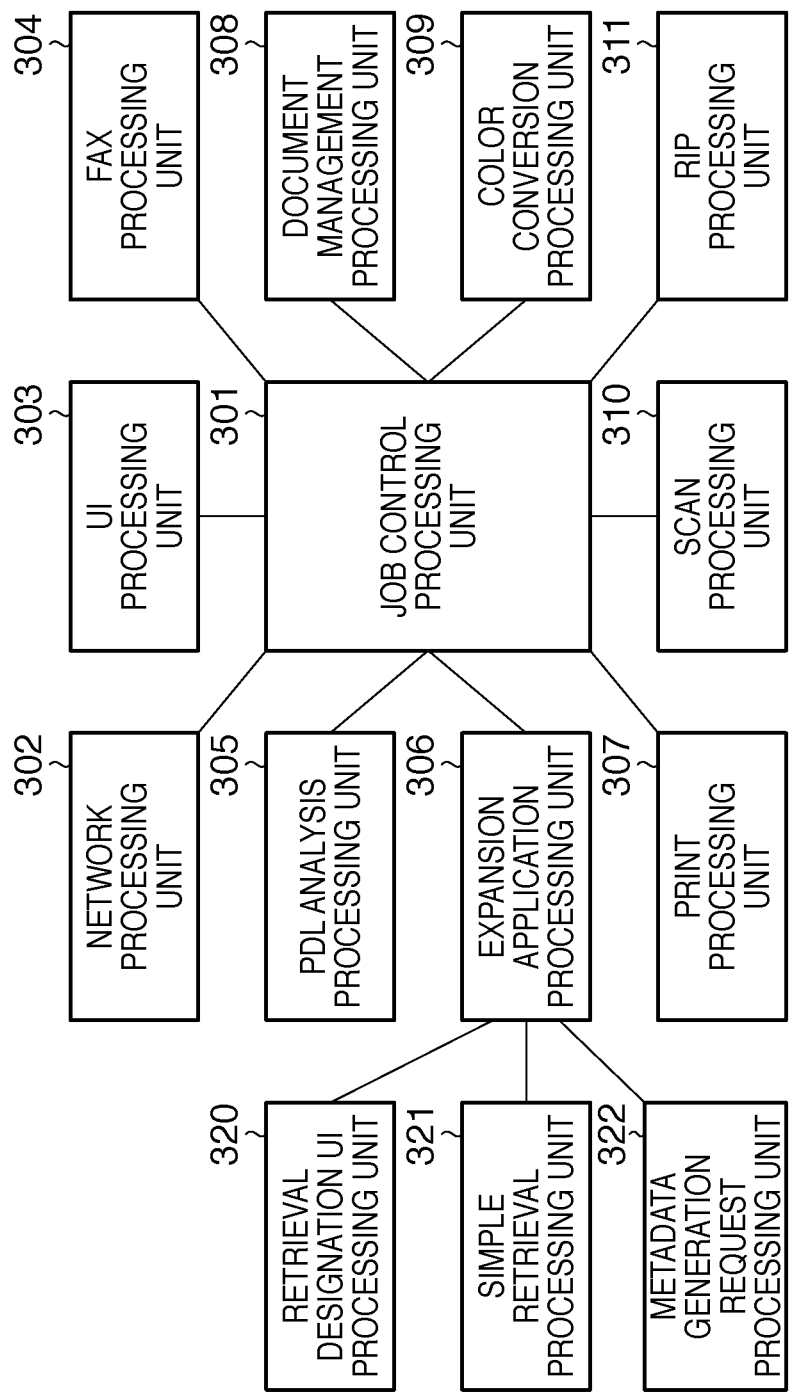
FIG. 4 is a block diagram showing an example of the arrangement of controller software of the color MFP 1 according to the embodiment.

FIG. 4 is a block diagram showing an example of the module arrangement of controller software which runs on the control unit 200 of the color MFP 1 according to this embodiment. This software mainly runs on the CPU 205.

A job control processing unit 301 shown in FIG. 4 generally controls software modules (some of which are not shown), and controls all jobs generated in the color MFP 1.

A network processing unit 302 is a module which controls external communications mainly made via the network I/F 211, and executes communication control with devices on the LAN 10. Upon reception of control commands and data from respective devices on the LAN 10, the network processing unit 302 notifies the job control processing unit 301 of the contents of the received commands and data. Also, the network processing unit 302 transmits control commands and data to respective devices on the LAN 10 based on instructions from the job control processing unit 301. The network processing unit 302 further includes an external export function, and publishes some directories on the file system created on the HDD 208 to respective devices on the LAN 10. The directories to be published can be set in advance. Also, accessible devices and users can be set for each directory.

A UI processing unit 303 executes control mainly associated with the operation unit 210. The UI processing unit 303 notifies the job control processing unit 301 of the operation contents on the operation unit 210 by the operator, and controls the displayed contents of the display screen on the operation unit 210 based on instructions from the job control processing unit 301.

A FAX processing unit 304 controls a FAX function. The FAX processing unit 304 receives FAX data via the modem 212, applies image processing specific for a FAX image to the received data, and notifies the job control processing unit 301 of the received image. The FAX processing unit 304 transmits an image designated by the job control processing unit 301 to a designated destination via FAX.

A PDL analysis processing unit 305 analyzes PDL data based on an instruction from the job control processing unit 301 to generate a DL that can be processed by a RIP processing unit 311, and notifies the job control processing unit 301 of the generated DL.

A color conversion processing unit 309 applies a color conversion process to a designated image based on an instruction from the job control processing unit 301, and notifies the job control processing unit 301 of the image after the color conversion process. The job control processing unit 301 notifies the color conversion processing unit 309 of input color space information, output color space information, and an image to which color conversion is applied.

The RIP processing unit 311 controls the RIP 216 to render the DL generated by the PDL analysis processing unit 305, thereby generating a raster image and attribute bits corresponding to respective pixels of the raster image. Then, the RIP processing unit 311 notifies the job control processing unit 301 of the raster image and attribute bits. The attribute bits generated by the RIP processing unit 311 include a total of 4 bits, that is, three bit fields respectively for a 1 color bit, 1 thin-line/small-character bit, and 2 object-type bits.

The color bit represents whether a corresponding pixel forms a color or monochrome object. If this bit="0", it indicates a pixel which forms a color object; if the bit="1", it indicates a pixel which forms a monochrome object. The thin-line/small-character bit represents whether or not a corresponding pixel forms a thin-line or small-character. If this bit="1", it indicates a pixel which forms a thin-line. The object-type bits represent what type of drawing object a corresponding pixel forms. If the object-type bits="01", they indicate a pixel which forms a character object. If the object-type bits="10", they indicate a pixel which form a graphics object. If the object-type bits="11", they indicate a pixel which form an image object. If the object-type bits="00", they indicate a pixel which form a line object. The thin-line/small-character bit represents whether or not a corresponding pixel forms a thin-line or small-character. If the thin-line/small-character bit="1" and the aforementioned object-type bits indicate a character object, they indicate that the corresponding pixel forms a small-character. If the thin-line/small-character bit="1", and the aforementioned object-type bits indicate a line object, they indicate that the corresponding pixel forms a thin-line.

A print processing unit 307 controls the image processing unit for image-edition 220, the printer image processing unit 219, and the printer engine 202 based on an instruction from the job control processing unit 301 to execute print processing for a designated image. The print processing unit 307 receives image data, image information (size, color mode, and resolution of the image data), layout information (offset, enlargement/reduction, and imposition), and output paper information (size and print direction) from the job control processing unit 301. Then, the print processing unit 307 controls the image processing unit for image-edition 220 and the printer image processing unit 219 to apply an appropriate image process to the image data, and controls the printer engine 202 to print an image on a designated paper sheet.

A scan processing unit 310 controls the scanner 201 and the scanner image processing unit 218 based on an instruction from the job control processing unit 301 to read an image of an original on the scanner 201. The instruction from the job control processing unit 301 includes a color mode, and the scan processing unit 310 executes a process according to the color mode. That is, if the color mode is "color", the scan processing unit 310 inputs an original as a color image; if the color mode is "monochrome", it inputs an original as a monochrome image. If the color mode is "Auto", the scan processing unit 310 executes color/monochrome determination of an original by a pre-scan, and inputs the original as an image based on the determination result. The scan processing unit 310 executes a scan of an original on the platen of the scanner 201, and inputs an image as digital data. The scan processing unit 310 notifies the job control processing unit 301 of color information of the input image. Furthermore, the scan processing unit 310 controls the scanner image processing unit 218 to apply an appropriate image process, such as image compression, to the input image, and notifies the job control processing unit 301 that the input image that has undergone the image process.

Figure 11A:
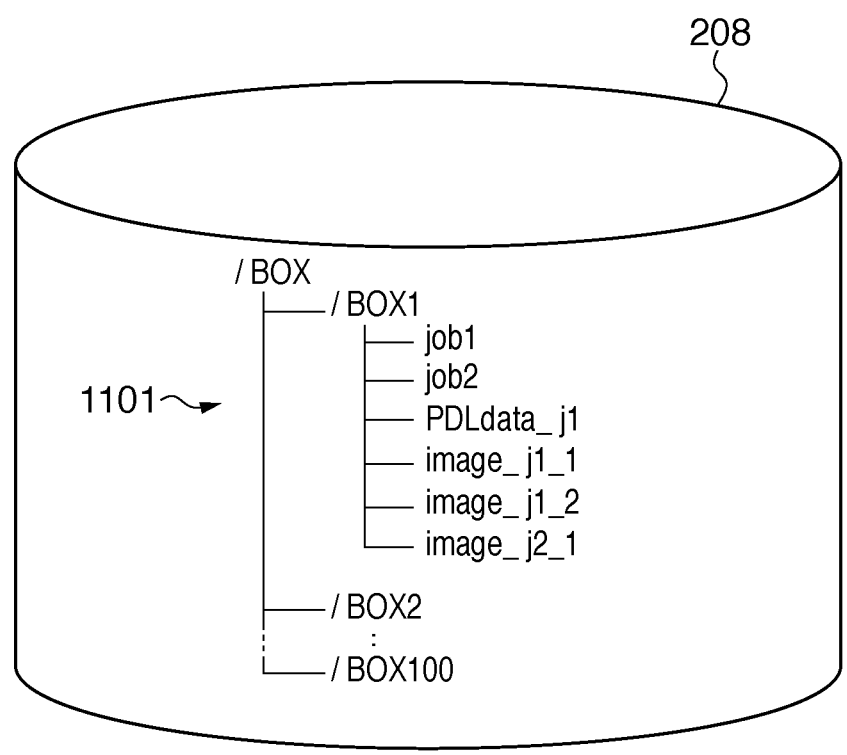
FIG. 11A is a view showing an example of the configuration of a mailbox directory created on an HDD according to the embodiment.

A document management processing unit 308 stores input PDL data and an image generated in the control unit 200 in mailbox directories created on the HDD 208 based on an instruction from the job control processing unit 301. Also, the document management processing unit 308 reads out, changes, and deletes data stored in the mailbox directories based on an instruction from the job control processing unit 301. Note that there are a plurality of mailboxes (for example, 100 mailboxes) in this embodiment, and corresponding mailbox directories are created on the HDD 208 for each respective mailbox. The operator can designate an arbitrary mailbox when instructing to store data in a mailbox. FIG. 11A shows an example of the mailbox directories.

(Expansion Application of Color MFP 1)

An expansion application processing unit 306 is an environment which mainly includes a Java™ virtual machine, and can dynamically load and execute a program (expansion application) described using Java™ byte codes. The expansion application processing unit 306 provides Java™ class libraries that allow the apparatus to use services of respective software modules including the job control processing unit 301. Note that Java™ class libraries are provided as a Java™ Native Interface (JNI).

In this embodiment, as expansion applications, a retrieve designation UI processing unit 320, a simple retrieval processing unit 321, and a metadata generation request processing unit 322 are prepared. The byte codes of the respective expansion applications are downloaded via the network processing unit 302, and are stored in the HDD 208. The retrieve designation UI processing unit 320, the simple retrieval processing unit 321, and the metadata generation request processing unit 322 run on the expansion application processing unit 306 according to instructions from the job control processing unit 301.

The retrieve designation UI processing unit 320 mainly executes a generation process to generate a display screen when the operator operates the operation unit 210 and opens a retrieval screen as an expansion function, a request process of the contents of a retrieval instruction input by the operator on the retrieval screen to a retrieval process, and a display process of the retrieval result notified from the retrieval request process. The retrieval processes that can be requested include the simple retrieval processing unit 321, and a high-level retrieval process published as a Web service by an external device on the LAN 10. Details of the operation of the retrieve designation UI processing unit 320 will be described later (see FIGS. 17 to 20).

The simple retrieval processing unit 321 executes a simple retrieval process when the operator instructs that a simple retrieval be conducted on the retrieval screen displayed by the retrieve designation UI processing unit 320. In the simple retrieval, the unit 321 conducts a full-text retrieval of metadata included in a designated retrieval target based on a designated condition, and notifies the retrieve designation UI processing unit 320 of the retrieval result. In this embodiment, the simple retrieval processing unit 321 serves as a first retrieval unit.

Note that the metadata generation request processing unit 322 will be described in detail later (see FIGS. 9 and 10).

Control Arrangement Example of Color MFP 2>

(Arrangement Example 2 of Controller Unit)

Figure 5:
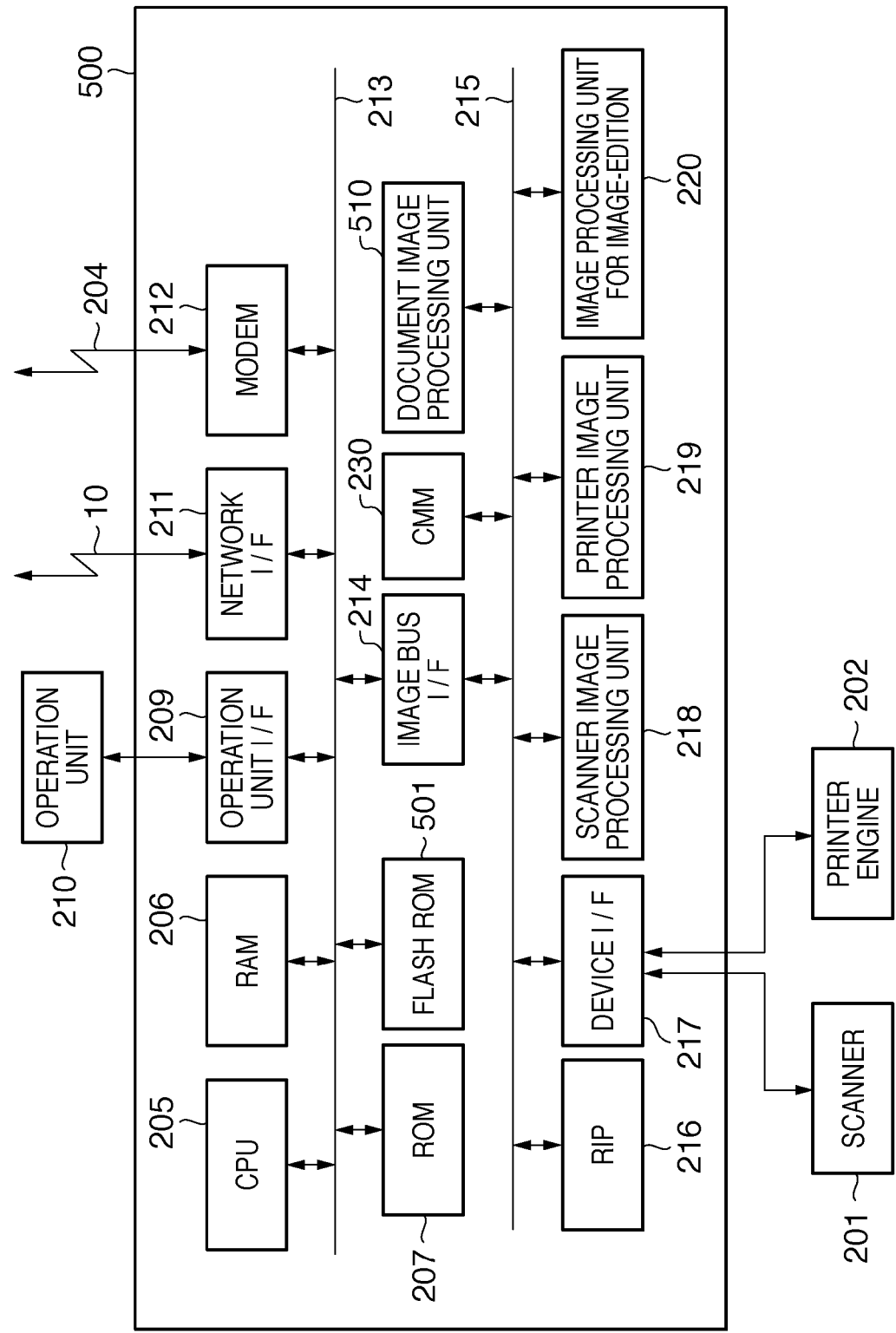
FIG. 5 is a block diagram showing an example of the arrangement of a control unit of the color MFP 2 according to the embodiment.

FIG. 5 is a block diagram showing an example of the arrangement of a control unit (to be also referred to as a controller hereinafter) of the color MFP 2 according to this embodiment.

Referring to FIG. 5, most of the modules which configure a controller unit 500 are the same as those which configure the controller unit 200 of the color MFP 1 shown in FIG. 3. Therefore, the same reference numerals as those in the controller unit 200 denote the same modules, and a repetitive description thereof will be omitted.

A flash ROM (FLASH ROM in FIG. 5) 501 shown in FIG. 5 stores system software for various processes, input image data, document data (to be described later), and the like. The flash ROM 501 is mounted in place of the HDD 208 in the controller unit 200 in FIG. 3, and has a low cost feature although it has a smaller capacity than the HDD 208.

A document image processing unit 510 is a dedicated hardware module which has both a function of extracting an image feature amount from image data, and an OCR function of extracting character string information, and is connected to the image bus 215.

(Arrangement Example 2 of Controller Software)

Figure 6:
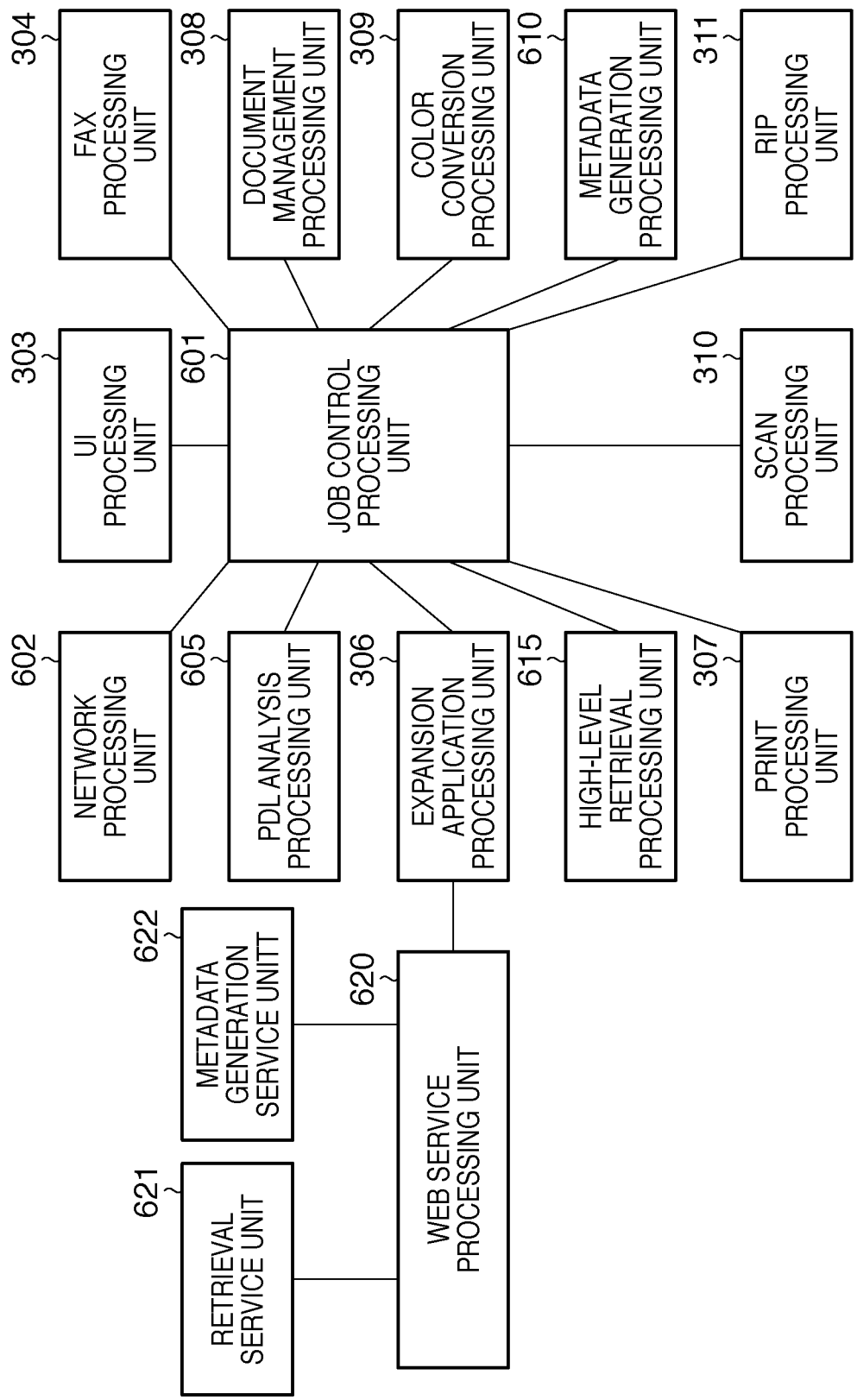
FIG. 6 is a block diagram showing an example of the arrangement of controller software of the color MFP 2 according to the embodiment.

FIG. 6 is a block diagram showing an example of the module arrangement of controller software which runs on the control unit 500 of the color MFP 2 according to this embodiment.

Referring to FIG. 6, most of software modules are the same as those which configure the controller software of the color MFP 1 shown in FIG. 4. Therefore, the same reference numerals as in FIG. 4 denote the same software modules, and a repetitive description thereof will be omitted.

A job control processing unit 601 shown in FIG. 6 generally controls software modules (some of which are not shown), and controls all jobs generated in the color MFP 2.

A network processing unit 602 is a module which controls external communications mainly made via the network I/F 211, and executes communication control with devices on the LAN 10. Upon reception of control commands and data from respective devices on the LAN 10, the network processing unit 602 notifies the job control processing unit 601 of the contents of the received commands and data. Also, the network processing unit 602 transmits control commands and data to respective devices on the LAN 10 based on instructions from the job control processing unit 601. The network processing unit 602 further includes a client function that allows it to access directories published by an export function of an external device on the LAN 10.

A PDL analysis processing unit 605 analyzes PDL data based on an instruction from the job control processing unit 601 to generate a DL that can be processed by the RIP processing unit 311 and PDL character information (to be described later), and notifies the job control processing unit 601 of the generated DL and PDL character information.

A metadata generation processing unit 610 generates metadata (to be described later) based on an instruction from the job control processing unit 601 (see FIG. 15).

A high-level retrieval processing unit 615 is a high-level retrieval process such as a conceptual retrieval that allows a retrieval from a natural sentence and sorting of retrieved information based on a hit rate or time-series, in addition to a fast full-text retrieval of retrieval target data. The high-level retrieval processing unit 615 further includes an image retrieval function of retrieving an image similar to a designated image from image data using image feature amounts. Upon reception of a retrieval target and retrieval method notified from the job control processing unit 601, the high-level retrieval processing unit 615 retrieves the designated retrieval target using the designated retrieval method, and notifies the job control processing unit 601 of the retrieval result. In this embodiment, the high-level retrieval processing unit 615 serves as a second retrieval unit.

(Expansion Application of Color MFP 2)

A Web service processing unit 620 is an expansion application which runs on the expansion application processing unit 306, and is an execution framework of Web services. That is, the Web service processing unit 620 has implementations of SOAP (Simple Object Access Protocol), WSDL (Web Service Description Language), and the like. On the Web service processing unit 620, a retrieval service unit 621 and metadata generation service unit 622 run as Web services, and operate in response to requests to respective services externally input via the network processing unit 602. Furthermore, the respective Web services as the processes on the Web service processing unit 620 can use the functions of various software modules on the control unit 500 via the JNI (Java Native Interface) of the expansion application processing unit 306.

The retrieval service unit 621 provides the function of the high-level retrieval processing unit 615 included in the control unit 500 as a Web service to external devices. Upon reception of a retrieval service request via the network processing unit 602, the retrieval service unit 621 notifies the high-level retrieval processing unit 615 of a retrieval target and retrieval method included in the request, and requests it to execute a retrieval process. After completion of a retrieval by the high-level retrieval processing unit 615, upon reception of the retrieval result, the retrieval service unit 621 notifies an external device that requested the service of the retrieval result as a result of the retrieval service request.

The metadata generation service unit 622 provides the function of the metadata generation processing unit 610 included in the control unit 500 to an external device as a Web service. Upon reception of a request of a metadata generation process via the network processing unit 602, the metadata generation service unit 622 notifies the metadata generation processing unit 610 of information of data included in the request, and requests it to generate metadata. After the end of generation of metadata by the metadata generation processing unit 610, upon reception of an end message, the metadata generation service unit 622 notifies an external device as a request source of the end message as a result of the metadata generation request.

<Processing Example of Image Processing System of This Embodiment>

The processing of the image processing system including the color MFPs 1 and 2 according to this embodiment will be described below.

<Mailbox Storage Process by Color MFP 1>

The mailbox storage process performed by the color MFP 1 according to this embodiment will be described below. An example of the configuration of data used in this mailbox storage process will be described first.

(Configuration Example of Document Structure)

Figure 8:
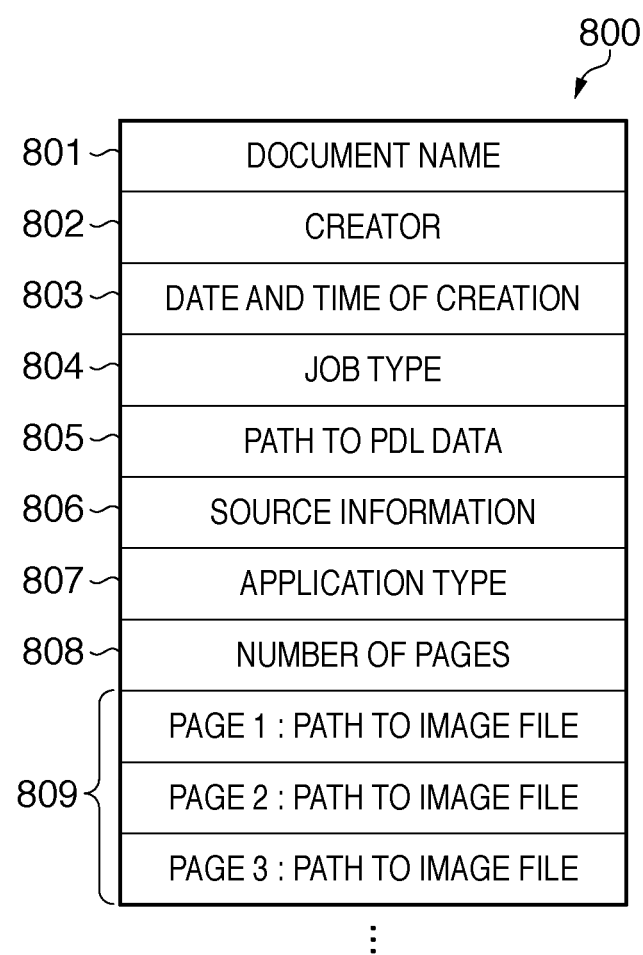
FIG. 8 is a view showing an example of a document structure according to the embodiment.

FIG. 8 shows an example of a document structure.

A document structure 800 holds a document name 801, the number of pages 808 included in a document, a creator 802, a date and time of creation 803, a job type 804, a path 805 to PDL data, source information 806, an application type 807, and paths 809 to image files of respective pages.

The job type 804 indicates a scan job in case of mailbox storage at the time of scanning, a PDL job at the time of reception of PDL data, or a FAX job at the time of FAX reception. The document name 801 is designated when the operator issues a mailbox storage instruction in case of a scan job, or indicates that given to PDL data in case of a PDL job. When the document name 801 is not designated, it is automatically generated. The creator 802 indicates a user name in case of a scan job and when the operator has made user authentication during operation, a sender of PDL data in case of a PDL job, or a FAX sender in case of a FAX job. The date and time of creation 803 stores that of each job. The source information 806 stores information of a host that sent PDL data in case of a PDL job or a FAX transmission source in case of a FAX job. The application type 807 is a source application of PDL data, and stores a value only for a PDL job. Note that upon creation of the document structure, the number of pages 808 is "0", and no path 809 to each file is stored.

(Configuration Example of Mailbox Directory)

FIG. 11A shows an example of mailbox directories created on the HDD 208.

A directory "/BOX" in FIG. 11A is a mailbox directory 1101 that stores respective mailbox directories. Directories "/BOX1", "/BOX2", and "/BOX100" are respectively mailbox directories, and the example of FIG. 11A includes 100 directories.

The mailbox directories respectively correspond to mailboxes which can be designated by the operator, and each mailbox name can be arbitrarily set by the operator. However, in this embodiment, assume that each mailbox directory name matches a mailbox name, for the sake of simplicity. Therefore, for example, when the operator designates a mailbox "BOX1" and inputs a mailbox storage instruction of given data (PDL data, an image file, or a document file), that data is stored in a mailbox directory "/BOX1".

In FIG. 11A, files "job1" and "job2" are document files, a file "PDLdata_j1" is PDL data, and files "image_j1_1", "image_j1_2", and "image_j2_1" are image files.

(Sequence Example of Mailbox Storage Process)

Figure 7:
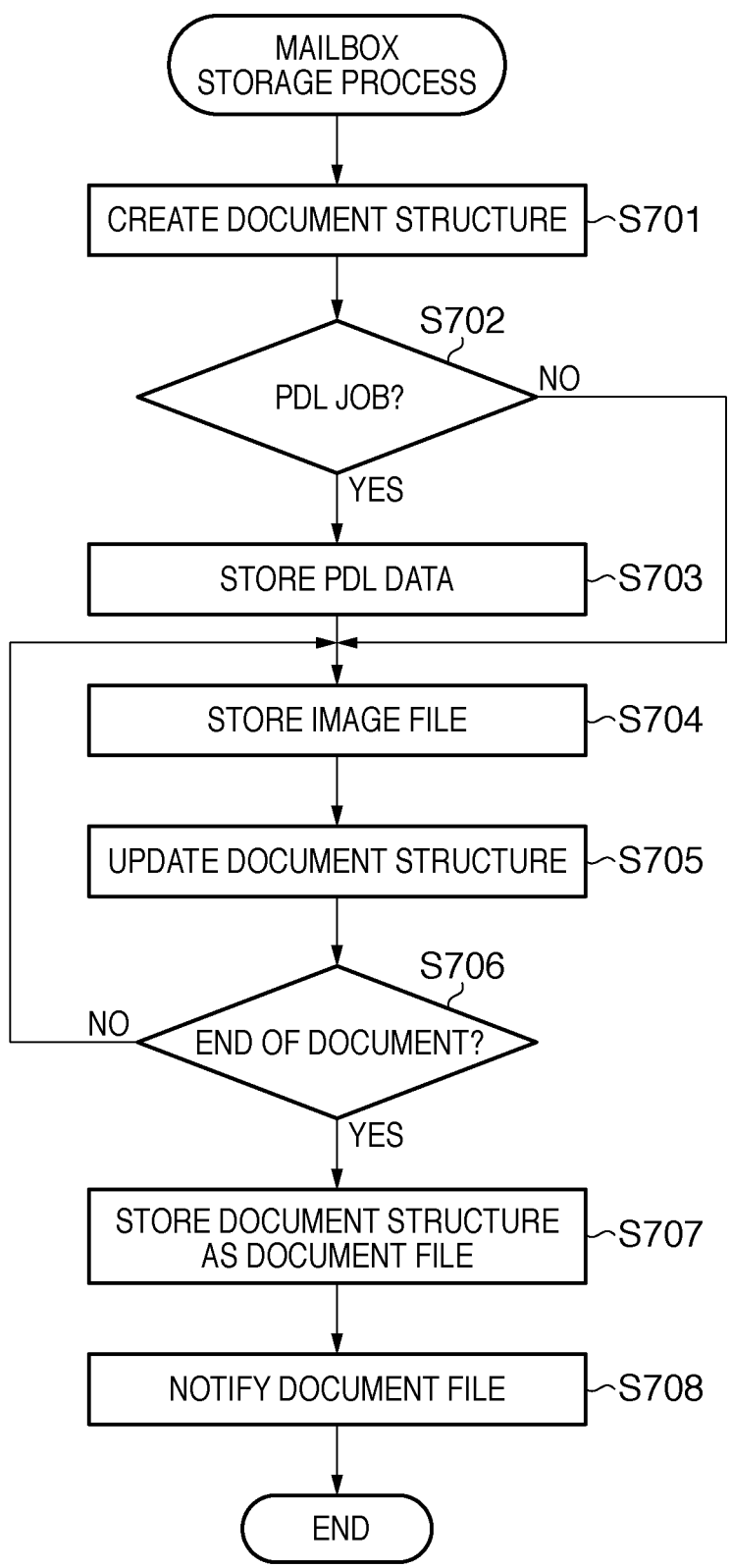
FIG. 7 is a flowchart showing an example of the sequence of a mailbox storage process of the color MFP 1 according to the embodiment.

FIG. 7 is a flowchart showing an example of the sequence of the mailbox storage process by the color MFP 1 according to this embodiment. This flowchart is executed by CPU 205 in FIG. 3.

The mailbox storage process is executed when a mailbox storage instruction is issued in advance at the time of FAX reception, when a mailbox storage instruction is issued at the time of scanning, and when a mailbox storage instruction is included in data upon reception of PDL data.

Upon reception of a mailbox storage message from the job control processing unit 301, the document management processing unit 308 creates the document structure shown in FIG. 8 (S701). The unit 308 determines in step S702 if a PDL job is received. If a PDL job is received, the unit 308 stores PDL data in a mailbox directory (see FIG. 11A) on the HDD 208, and describes a path to the stored PDL data in a PDL data path of the document structure (S703).

If the received job is not a PDL job, the job control processing unit 301 notifies the document management processing unit 308 of a raster image generated by the RIP processing unit 311, an input image generated by the FAX processing unit 304, or an input image generated by the scan processing unit 310. The document management processing unit 308 stores the notified image in a mailbox directory on the HDD 208 as an image file (S704).

In step S705, the document management processing unit 308 adds a path to the image file stored in step S704 to the document structure, and increments the number of pages of the document structure. The unit 308 repeats steps S704 and S705 until it receives a document end message from the job control processing unit 301 (S706). Upon reception of a document end message from the job control processing unit 301, the process advances to step S707.

In step S707, the document management processing unit 308 stores the document structure in a mailbox directory on the HDD 208 as a document file, and notifies the job control processing unit 301 of a path to the document file, thus ending the mailbox storage process (S708).

<Metadata Generation Request Process by Color MFP 1>

The metadata generation request process by the color MFP 1 according to this embodiment will be described below. An example of the configuration of data used in this metadata generation request process will be described first.

(Example of Metadata Directory)

Figure 11B:
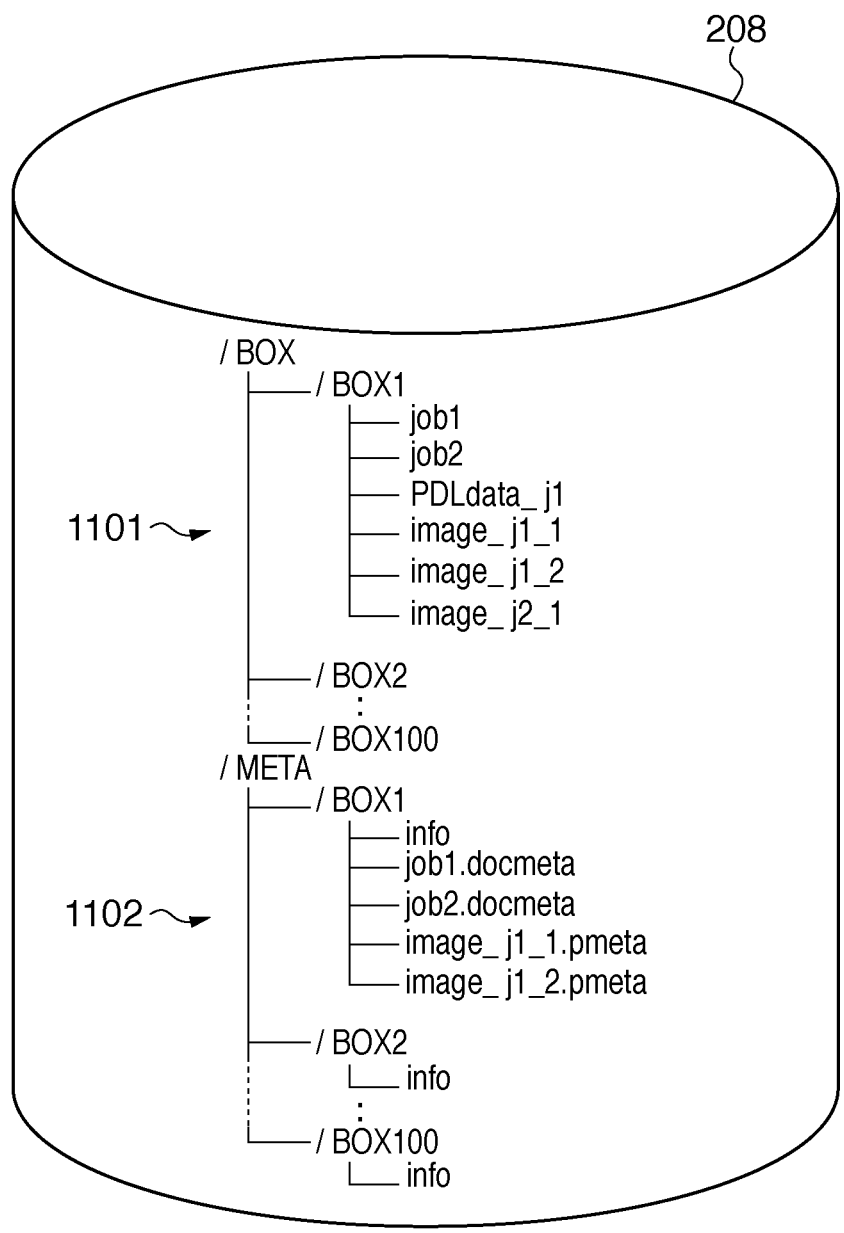
FIG. 11B is a view showing an example of the configuration of a metadata directory created on the HDD according to the embodiment.

FIG. 11B shows an example of a metadata directory created by a metadata generation process.

Directories under a directory "/BOX" in FIG. 11B form the mailbox directory 1101 as in FIG. 11A, and those immediately under a directory "/META" form a metadata directory 1102. The directory configuration under the directory "/BOX" is the same as that under the directory "/META".

Metadata directories "/BOX1", "/BOX2", and "/BOX100" respectively correspond to the mailbox directories "/BOX1", "/BOX2", and "/BOX100". In each metadata directory, a file "info" as metadata directory information is generated.

Data "job1.docmeta" and "job2.docmeta" stored in the metadata directory "/BOX1" in FIG. 11B are document metadata corresponding to the document files "job1" and "job2" stored in the box directory "/BOX1". Also, data "image_j1_1.pmeta" and "image_j1_2.pmeta" are page metadata corresponding to the image files "image_j1_1" and "image_j1_2". The document metadata and page metadata will be described later.

FIG. 12 shows an example of metadata directory information 1200.

A metadir_hash attribute included in a "<metadir> tag" block includes a 16-byte hash value generated from information of respective files included in each metadata directory. This hash value is generated and updated by a metadata generation request destination. A "<not_created_list> tag" block included in the "<metadir> tag" block is a non-creation list. The non-creation list is a list of document files whose metadata are not created of those stored in a mailbox directory corresponding to a given metadata directory. Each list entry attribute included in the "<not_created_list> tag" block indicates a document file whose metadata is not created.

(Sequence Example of Metadata Generation Request Process)

Figure 9:
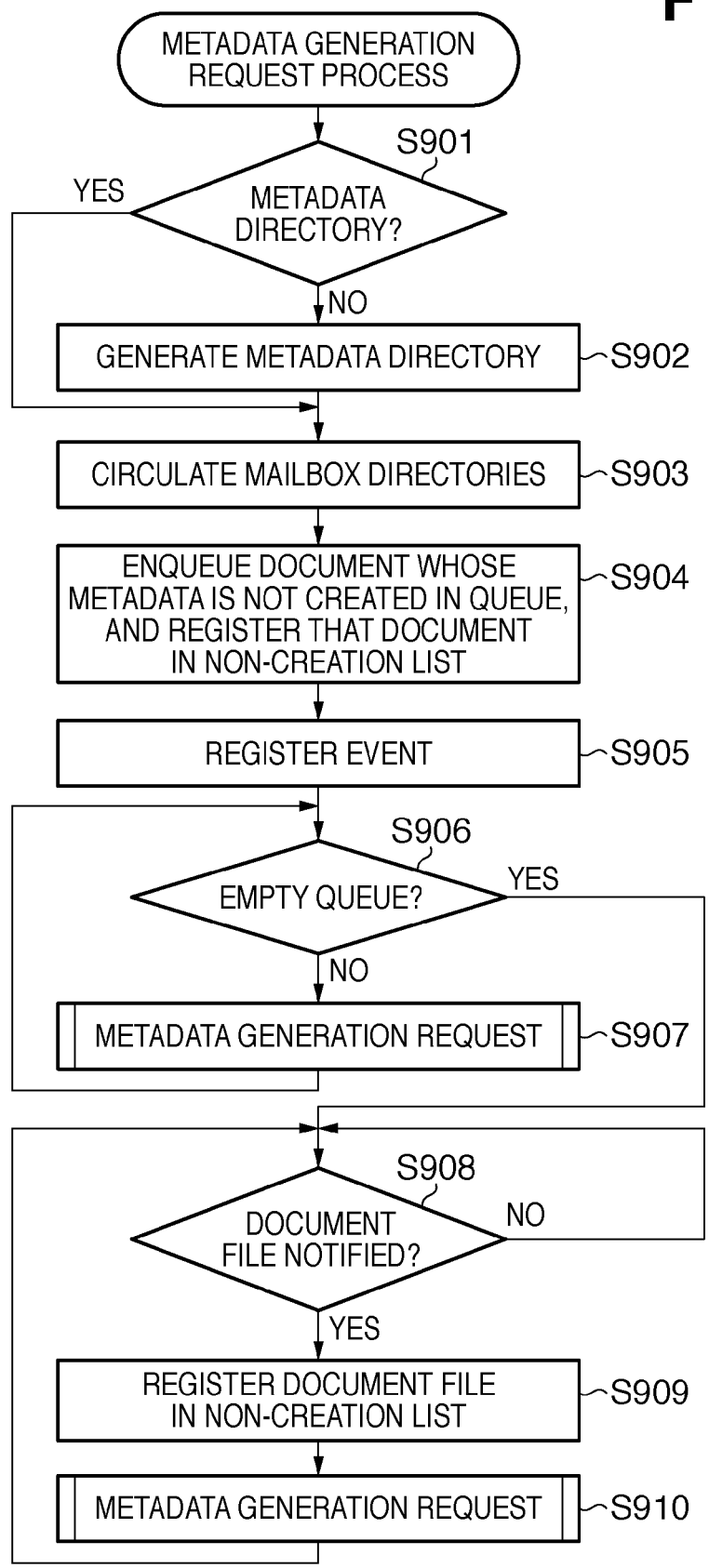
FIG. 9 is a flowchart showing an example of the sequence of a metadata generation request process of the color MFP 1 according to the embodiment.
Figure 10:
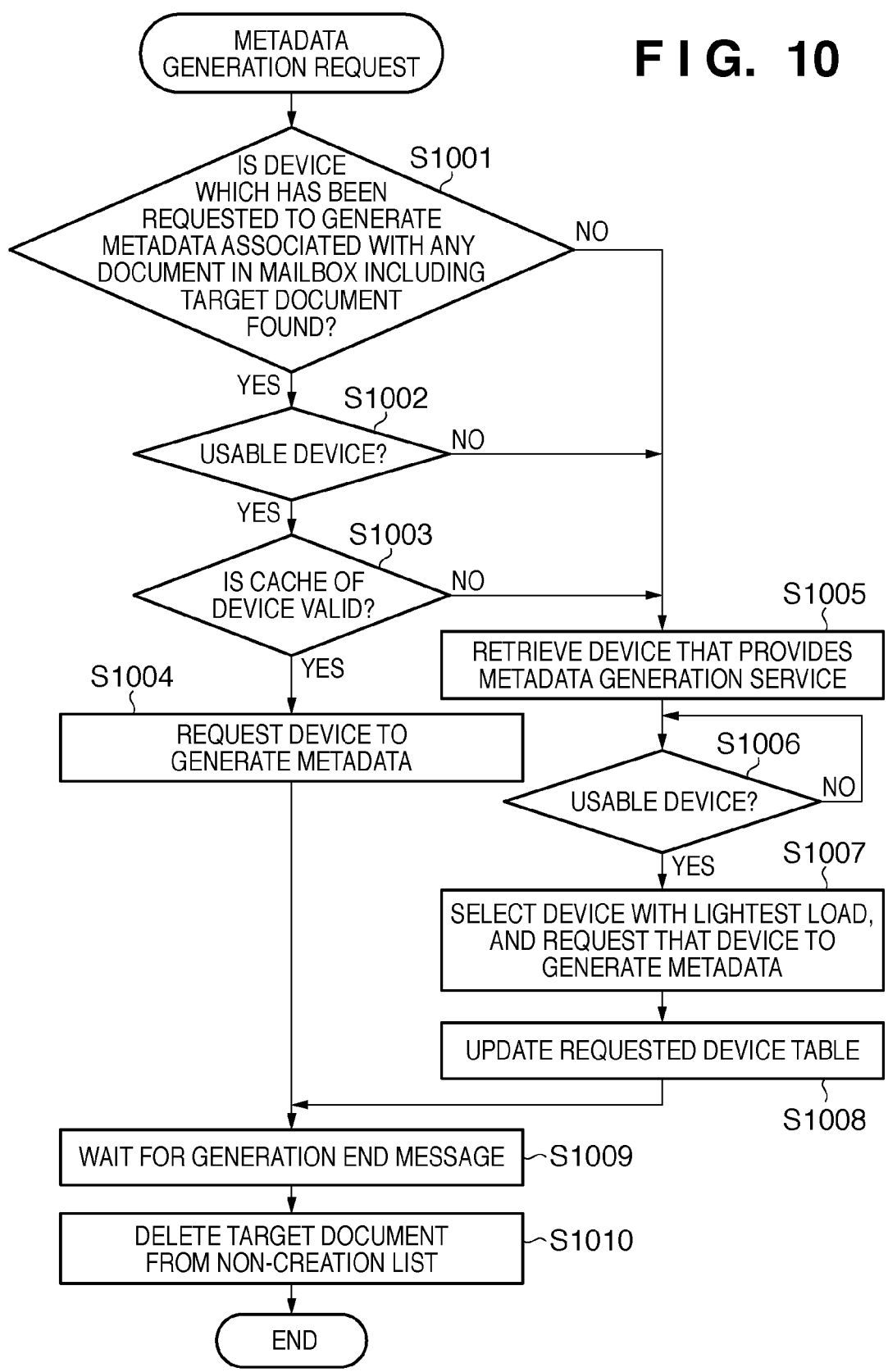
FIG. 10 is a flowchart showing an example of the sequence of a metadata generation request routine of the color MFP 1 according to the embodiment.

FIGS. 9 and 10 are flowcharts showing an operation example of the metadata generation request processing unit 322 in the color MFP 1 according to this embodiment. These flowcharts are executed by CPU 205 in FIG. 3.

Since the metadata generation request processing unit 322 is implemented as an expansion application, it may often not be launched. In this case, the byte codes of the metadata generation request process are downloaded and launched.

After the metadata generation request processing unit 322 is launched, it confirms if a metadata directory is generated on the HDD 208 (S901). If no metadata directory is generated, the unit 322 generates that directory (S902). If the metadata directory is generated, the process advances to step S903.

In step S903, the metadata generation request processing unit 322 circulates the mailbox directories to detect a document file whose metadata is not created. The unit 322 enqueues the detected document file in an execution queue, and adds it to a non-creation list included in metadata directory information (see FIG. 12) in each metadata directory corresponding to the mailbox directory which stores that document file (S904).

In step S905, the metadata generation request processing unit 322 registers an event in the job control processing unit 301. In this event process, when the document management processing unit 308 ends the storage process of a document file in a mailbox and notifies the job control processing unit 301 of a path to that document file, it notifies the metadata generation request processing unit 322 of the path to that document file.

In step S906, the metadata generation request processing unit 322 confirms the execution queue. If a document file is registered in the execution queue, the unit 322 executes a metadata generation request process (S907: details will be described later with reference to FIG. 10) of that document file. If the execution queue is empty, the process jumps to step S908. The processes in steps S906 and S907 are repeated until the execution queue becomes empty.

In step S908, the metadata generation request processing unit 322 suspends its operation until it receives a path to a document file from the job control processing unit 301. Upon reception of the path to the document file, the unit 322 adds that path to a non-creation list included in metadata directory information of a metadata directory corresponding to a mailbox directory that includes the document file (S909).

In step S910, the metadata generation request processing unit 322 executes a metadata generation request process (to be described in detail later with reference to FIG. 10) of the document file whose path is received in step S908. The process then returns to step S908 to wait for reception of a path to a document file.

(Metadata Generation Request Routine)

The operation sequence of the metadata generation request routine executed in steps S907 and S910 in FIG. 9 will be described below with reference to the flowchart of FIG. 10. The metadata generation request routine receives, as inputs, a path to a document file whose metadata generation request is to be issued, and a mailbox that stores the document file.

(Example of Requested Device Table)

FIG. 13 shows an example of a requested device table 1300 used in the metadata generation request routine shown in FIG. 10.

The requested device table 1300 saves, for each mailbox, a device to which a metadata generation request of a document included in that mailbox was issued.

Each row 1303 of the table in FIG. 13 includes information of a mailbox name and a device to which a metadata generation request of a document included in that mailbox has ever been issued. A column 1301 in FIG. 13 stores mailbox names. A column 1302 stores information of each device to which a metadata generation request has ever been issued, and when a metadata generation request has never been issued for documents in a given mailbox, a corresponding row is empty. In FIG. 13, the address of a device is stored as information of the device to which a metadata generation request has ever been issued.

In step S1001, the metadata generation request processing unit 322 determines the presence/absence of a device to which a metadata generation request for another document in a mailbox that includes the input document file has been issued before, with reference to the requested device table shown in FIG. 13. If the device to which a metadata generation request was issued is found, the process advances to step S1002; otherwise, the process advances to step S1005. In this embodiment, selecting a metadata generation request destination depending on a device to which a metadata generation request has ever been issued will be referred to as a first request destination selection unit.

In step S1002, the metadata generation request processing unit 322 sends, using a SOAP message, an inquiry as to whether or not a metadata generation service is usable to a device which is determined in step S1001 as that to which the metadata generation request has ever been issued. If a usable response is returned, the process advances to step S1003; otherwise, the process advances to step S1005.

In step S1003, the metadata generation request processing unit 322 notifies the device which is determined in step S1001 as that to which the metadata generation request has ever been issued of a metadata directory corresponding to the mailbox including the input document, using a SOAP message. Also, the unit 322 requests that device to send a hash value. Upon reception of a hash value sent from the requested device, the unit 322 compares the received hash value with that of itself. If the two values match, the unit 322 determines that a metadata cache of the requested device is valid, and the process advances to step S1004. If the two hash values do not match, the process advances to step S1005. In this embodiment, selecting a metadata generation request destination depending on whether or not the metadata cache is valid will be referred to as a second request destination selection unit.

In step S1004, the metadata generation request processing unit 322 requests the device that is determined in step S1001 as one which has issued a metadata generation request to generate metadata using a SOAP message. This metadata generation request is implemented when the unit 322 notifies that device of a path to the input document file and that to the metadata directory corresponding to the mailbox including the document.

In step S1009, the metadata generation request processing unit 322 waits for reception of a metadata generation end message from the device to which the metadata generation request was issued. Upon reception of the message, the process advances to step S1010. In step S1010, the unit 322 deletes the document file from the non-creation list included in metadata directory information in the metadata directory corresponding to the mailbox directory including the requested document file, thus ending the metadata generation request routine.

On the other hand, if no requested device is found in step S1001, if the request device is unusable in step S1002, or if the cache is invalid in step S1003, a new request destination device is found in step S1005 and subsequent steps.

In step S1005, the metadata generation request processing unit 322 retrieves a device which provides a metadata generation service on the LAN 10. The service retrieval is conducted as an inquiry to a UDDI (Universal Description, Discovery and Integration) registry server (not shown) on the LAN 10. As a result of the inquiry, a plurality of devices may often be retrieved. In place of issuing an inquiry to the UDDI registry server, a list of devices which provide a metadata generation service may be registered in advance.

In step S1006, the metadata generation request processing unit 322 sends an inquiry as to whether or not a metadata generation service is usable to each device retrieved in step S1005 using a SOAP message. If a metadata generation service is unusable in the retrieved device, the metadata generation request processing unit 322 polls an inquiry as to whether or not a metadata generation service is usable until a device that allows to use the service is found. If at least one device that allows to use the metadata generation service is found, the process advances to step S1007.

In step S1007, the metadata generation request processing unit 322 sends an inquiry about load information to each device that allows to use the metadata generation service in step S1006, using a SOAP message. Based on load information returned from each inquired device, the unit 322 selects a device with the lightest load and requests it to generate metadata. This metadata generation request is implemented as in step S1004 when the unit 322 notifies that device of a path to the input document file and that to the metadata directory corresponding to the mailbox including the document. In the present invention, selecting a device with the lightest load as a metadata generation request destination will be referred to as a third request destination selection unit. In step S1008, the requested device table 1300 is updated.

After that, in steps S1009 and S1010 above, the metadata generation request processing unit 322 waits for a metadata generation end message, and deletes the document file from the non-creation list upon reception of the end message, thus ending the metadata generation request routine.

<Metadata Generation Service by Color MFP 2>

A metadata generation process by the color MFP 2 upon reception of a metadata generation request from the color MFP 1 of this embodiment will be described below. An example of the configuration of data used in this metadata generation process will be described first.

(Configuration Example of Document Metadata)

FIG. 16 shows an example of document metadata 1600.

A Name attribute included in a "<DocMetadata> tag" block includes a document name, which is "Report" in the example of FIG. 16. A Box attribute includes a mailbox directory that stores the document file, and indicates that the corresponding mailbox directory is "Box1" in the example of FIG. 16. A Docfile attribute includes a file name of the document file, which is "job1" in the example of FIG. 16. Note that a document file corresponding to document metadata can be uniquely determined by the mailbox directory and the file name.

A Kind attribute includes information of a job type, and indicates a PDL job in the example of FIG. 16. A PageNum attribute includes the number of pages included in a document, and indicates "2 pages" in the example of FIG. 16. A Date attribute includes information of a date and time of creation of a document file, and indicates in the example of FIG. 16 that the document file was created just at 00:00:00, Jan. 1, 2006.

A User attribute includes information of a creator, and indicates in the example of FIG. 16 that user AAA sent PDL data to the color MFP 1. An Application attribute includes information of an application type, and indicates in the example of FIG. 16 that the sent PDL data was generated upon printing an image created using an application MEMO. A From attribute includes source information, and indicates in the example of FIG. 16 that the PDL data was sent from a PC with an IP address 192.168.1.0.

The aforementioned pieces of attribute information are extracted from a document file notified to the metadata generation processing unit 610 of the color MFP 2 in step S1501 in FIG. 15 (to be described later), and are added to document metadata. In this embodiment, such attribute information part of a document will be referred to as a document specifying part.

A "<PageList> tag" block included in the "<DocMetadata> tag" block includes a list of page metadata files added in step S1509 in FIG. 15 (to be described later). Each PageMeta attribute includes a file name of page metadata. In the example of FIG. 16, file names "image_j1_1.pmeta" and "image_j1_2.pmeta" of page metadata for two pages are included. In this embodiment, such attribute information part of a page will be referred to as a page specifying part.

(Sequence Example of Metadata Generation Service)

Figure 14:
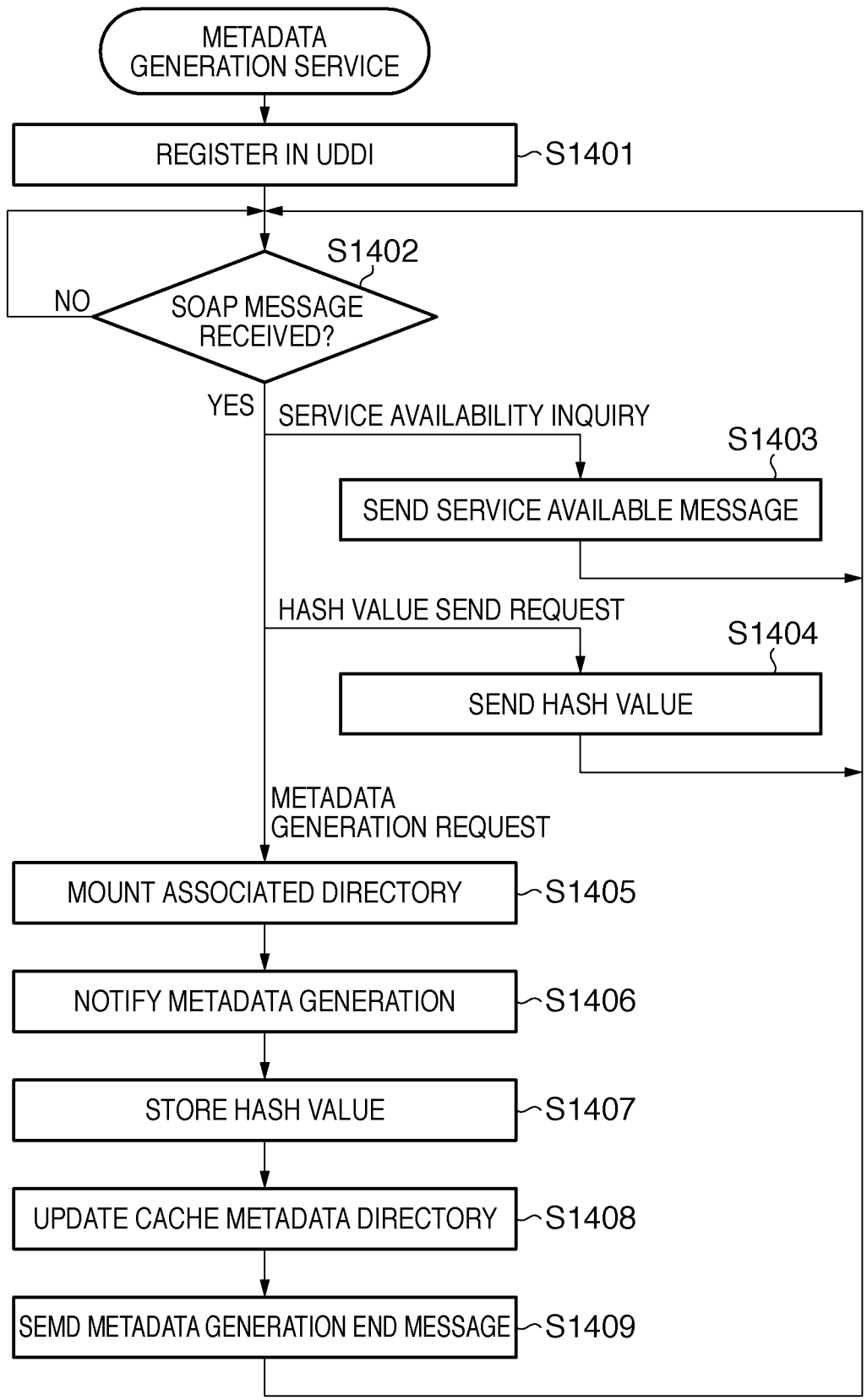
FIG. 14 is a flowchart showing an example of the sequence of a metadata generation service of the color MFP 2 according to the embodiment.

FIG. 14 is a flowchart showing the operation sequence of the metadata generation service unit 622 of the color MFP 2 according to this embodiment. This flowchart is executed by CPU 205 in FIG. 5.

Upon launching a metadata generation service, the metadata generation service unit 622 registers a metadata generation service in the UDDI registry server (not shown) on the LAN 10 (S1401), and waits for reception of a SOAP message for that service (S1402). Upon reception of a SOAP message in step S1402, the metadata generation service unit 622 switches a process according to the message.

If the message is an inquiry about availability of a metadata generation service, the metadata generation service unit 622 sends a service available message to the device that issued the inquiry in step S1403, and the process returns to step S1402 to wait for reception of a SOAP message.

If the message received in step S1402 is a hash value send request, the metadata generation service unit 622 inspects the presence/absence of a cache metadata directory corresponding to a metadata directory included in the request message in step S1404. If that directory is found, the unit 622 reads out a hash value included in metadata directory information in that directory, and sends the readout hash value to the device which issued the inquiry. After that, the process returns to step S1402 to wait for reception of a SOAP message.

If the message received in step S1402 is a metadata generation request, the process advances to step S1405.

In step S1405, the metadata generation service unit 622 mounts the mailbox directory including the document file and metadata directory included in the message under a directory "/net/device name/". The device name in the directory indicates the device which issued the metadata generation request. For example, upon reception of a metadata generation request including a path "/BOX/BOX1/job1" of a document file from the color MFP 1, the metadata generation service unit 622 can access that document file of the color MFP 1 by accessing "/net/color MFP 1/BOX/BOX1/job1". Furthermore, when the path of a metadata directory is "/META/BOX1", the unit 622 can access the metadata directory of the color MFP 1 by accessing "/net/color MFP 1/META/BOX1".

In step S1406, the metadata generation service unit 622 notifies the metadata generation processing unit 610 of the path to the document file in the mailbox directory and that to the metadata directory mounted in step S1405 via the job control processing unit 601. In response to this notification, the metadata generation processing unit 610 executes a metadata generation process. The operation of the metadata generation processing unit 610 will be described later (see FIG. 15). The unit 610 generates metadata for respective pages of the document file that has undergone the metadata generation process, and document data (to be described later) in the notified metadata directory.

In step S1407, the metadata generation service unit 622 calculates a 128-bit hash value from information of respective files included in the metadata directory mounted in step S1405. In step S1407, the unit 622 registers the hash value in the attribute "<metadir_hash>" in metadata directory information included in the metadata directory to update the information.

In step S1408, the metadata generation service unit 622 updates the cache metadata directory corresponding to the metadata directory mounted in step S1405. The cache metadata directory is a directory created under a directory "/cachemeta/" on the flash ROM 501, and is mirror information of that metadata directory. For example, a cache metadata directory of a metadata directory "/net/color MFP 1/META/BOX1" is "/cachemeta/color MFP 1/META/BOX1". Upon updating a cache metadata directory, if no corresponding cache metadata directory exists, that directory is created by copying the metadata directory. If the cache metadata directory already exists, only a file as a difference is copied from the metadata directory, thus matching the contents of the metadata directory and cache metadata directory.

In step S1409, the metadata generation service unit 622 sends a metadata generation end message to the device which issued the metadata generation request (the color MFP 1 in this example). After that, the process returns to step S1402 to wait for reception of a SOAP message.

(Sequence Example of Metadata Generation Process)

Figure 15:
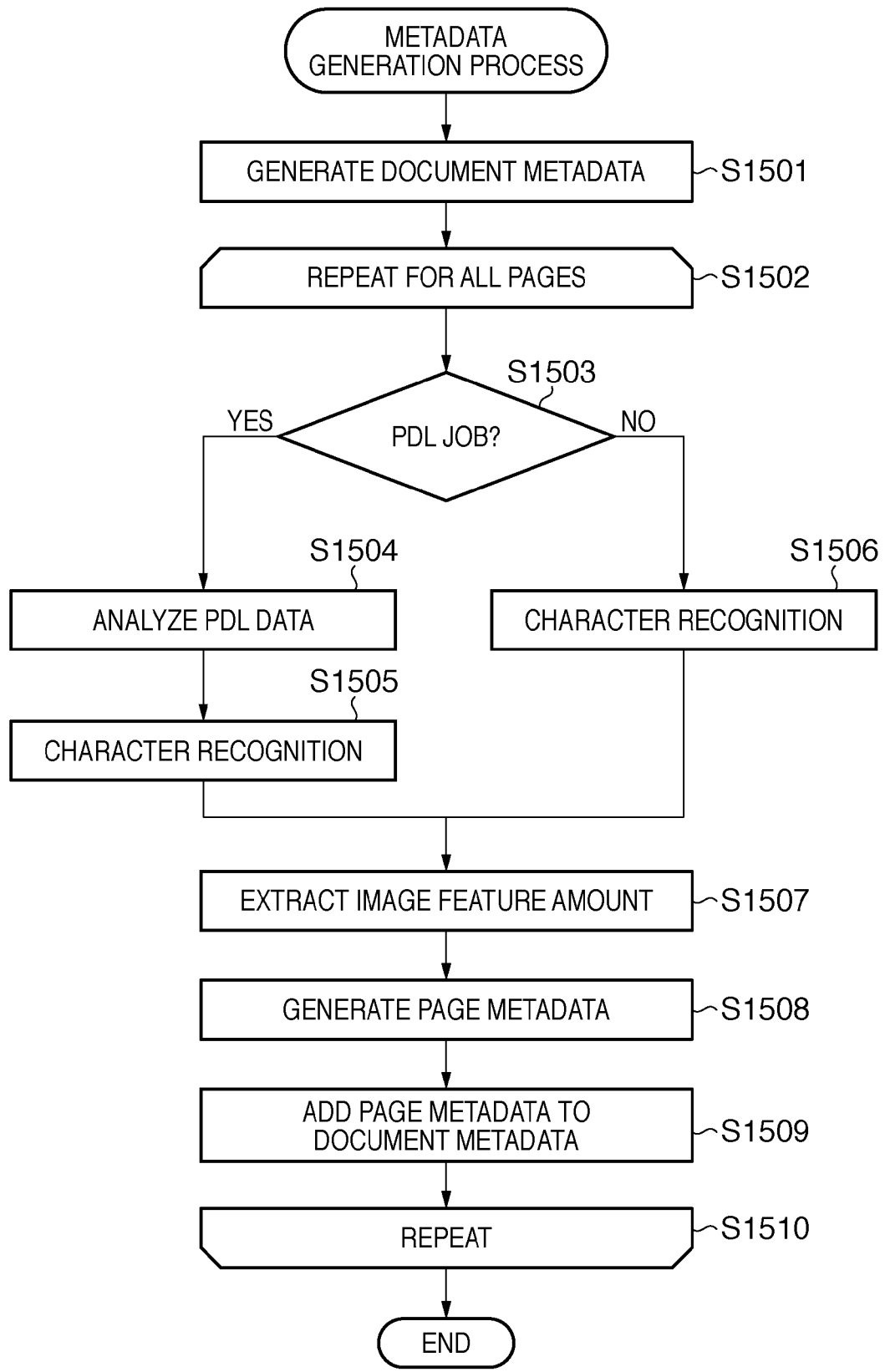
FIG. 15 is a flowchart showing an example of the sequence of a metadata generation process of the color MFP 2 according to the embodiment.

FIG. 15 is a flowchart showing the operation sequence of the metadata generation processing unit 610 of the color MFP 2 according to this embodiment. This flowchart is executed by CPU 205 in FIG. 5.

In response to reception of the path to the document file and that to the metadata directory based on the notification in step S1406 in FIG. 14 above from the job control processing unit 601, the metadata generation processing unit 610 starts a metadata generation process.

Upon starting the metadata generation process, the metadata generation processing unit 610 generates the aforementioned document metadata shown in FIG. 16 in step S1501. One document metadata is generated per document file, and includes information associated with the overall document and path information to page metadata. The document metadata is generated as a file having a prefix ".docmeta" on the notified metadata directory.

Step S1502 indicates that the metadata generation processing unit 610 repeats processes in steps S1503 to S1510 in correspondence with the number of pages included in the document.

In step S1503, the metadata generation processing unit 610 checks the job type of the notified document file. If the job type indicates a PDL job, the process advances to step S1504; if it indicates another job, the process advances to step S1506.

In step S1504, the metadata generation processing unit 610 reads out a path to PDL data from the notified document file, and notifies the PDL analysis processing unit 605 of the PDL data via the job control processing unit 601, thus executing a PDL analysis process. The PDL analysis processing unit 605 analyzes the PDL data to extract character data included in the PDL data.

After step S1504, in step S1505 the metadata generation processing unit 610 extracts a path to an image file included in the notified document file, and executes a character recognition process for that image. In the character recognition processing, a region segmentation process, a character extraction process, and a pattern matching process are executed. In this character recognition process, the region segmentation process uses attribute bit information included in the image file. The character extraction process and the pattern matching process use the character information extracted by the PDL analysis process in step S1504, thus improving the recognition rate and efficiency.

On the other hand, if the job type does not indicate a PDL job, the metadata generation processing unit 610 extracts a path to an image file included in the notified document file, and executes a character recognition process of that image in step S1506. In the character recognition processing, a region segmentation process, a character extraction process, and a pattern matching process are executed.

In step S1507, the metadata generation processing unit 610 extracts image feature amounts from regions determined as image or graphic regions of those which are obtained by the region segmentation process in step S1505 or S1506. Note that most of the character recognition process in step S1505 or S1506 and the image feature amount extraction process in step S1507 are executed at high speed using the document image processing unit 510 as dedicated hardware.

In step S1508, the metadata generation processing unit 610 stores the page number, the character information extracted in steps S1504 and S1505, and the image feature amounts extracted in step S1507 in page metadata. The page metadata is generated as a file having a prefix ".pmeta" on the notified metadata directory.

In step S1509, the metadata generation processing unit 610 adds the file name of the page metadata generated in step S1508 to the document metadata, thus ending a metadata generation process for one page.

<Retrieval Instruction UI Process by Color MFP 1>

The operation of the retrieve designation UI processing unit 320 in the color MFP 1 according to this embodiment will be described below with reference to the flowchart of FIG. 17 and UI screen examples of FIGS. 18, 19, and 20.

The retrieve designation UI processing unit 320 performs a process launched when the operator calls a retrieval screen of documents in mailboxes by operating the operation unit 210. Note that since the retrieve designation UI processing unit 320 is implemented as an expansion application, the byte codes may often not be downloaded in the device. In this case, the retrieval screen cannot be called.

A display screen on the operation unit 210 in the retrieve instruction UI process will be described first.

(Example 1 of Retrieval Instruction Screen)

Figure 18:
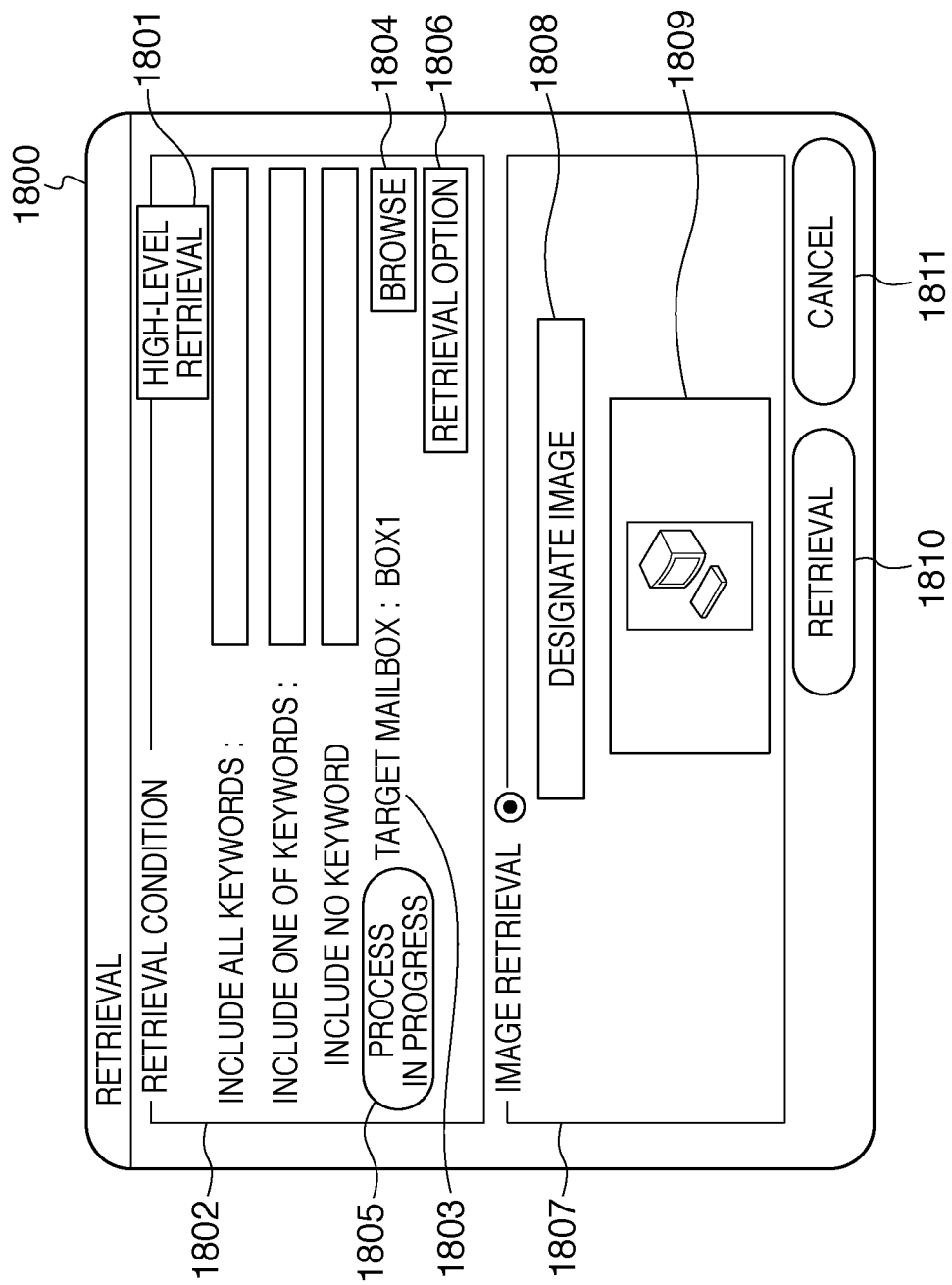
FIG. 18 is a view showing an example of a retrieval instruction screen which allows the user to use a high-level retrieval function of the color MFP 1 according to the embodiment.

FIG. 18 shows an example of a retrieval instruction screen 1800 that allows the operator to use a high-level retrieval function.

A field 1801 indicates that a high-level retrieval service on the network is available. An area 1802 is a setting area of basic retrieval conditions, and allows the operator to designate AND condition keywords, OR condition keywords, and NOT condition keywords. A field 1803 indicates a mailbox folder as a retrieval target. By pressing a button 1804, selectable mailboxes are displayed, and the operator can select a desired mailbox. In the example of FIG. 18, the field 1803 indicates that BOX1 is selected as a retrieval target mailbox. Note that the number of mailboxes that can be selected as a retrieval target is not limited to one, and a plurality of or all mailboxes can be selected.

A field 1805 in FIG. 18 indicates the presence/absence of a document file whose metadata is not created in the retrieval target mailbox displayed in the field 1803. The presence/absence of a document file whose metadata is not created is determined based on that of a non-creation list included in metadata directory information in a metadata directory corresponding to each mailbox selected as a retrieval target. If a document file whose metadata is not created is included, "process in progress" is displayed in the field 1805, thus indicating a possibility of an inaccurate retrieval result. When metadata of all documents included in each mailbox as the retrieval target are already created, "OK" is displayed in the field 1805.

Reference numeral 1806 denotes a button to be pressed to transit to a retrieval option setting screen. The retrieval option setting screen allows the operator to set more detailed retrieval conditions and to designate the display order of the retrieval results. On the retrieval option setting screen, the operator designates a conceptual retrieval using a natural sentence, a retrieval based on creation times, a retrieval based on application types, sorting based on hit rates of the retrieval results, sorting based on creation times, and sorting based on browse times.

Reference numeral 1807 denotes an area that allows the operator to set an image retrieval. By checking an upper radio button on the area 1807, the operator can instruct the execution of image retrieval. The image retrieval is a function of retrieving document files including images similar to an image displayed on an area 1809. Upon pressing a button 1808, the retrieval instruction screen transits to an image selection screen that allows the operator to select and input a retrieval target image used in the image retrieval. The image selected on the image selection screen is displayed on the preview area 1809.

Reference numeral 1810 denotes a button pressed to instruct the start of a retrieval. When the operator presses this button, he or she instructs the conducting of document file retrieval in the designated mailbox under the retrieval condition set on the screen 1800. Reference numeral 1811 denotes a button pressed to cancel the retrieval instruction. When the operator presses this button, the retrieval designation UI processing unit 320 aborts its process, and returns to a state before the retrieval instruction screen is displayed.

(Example 2 of Retrieval Instruction Screen)

Figure 19:
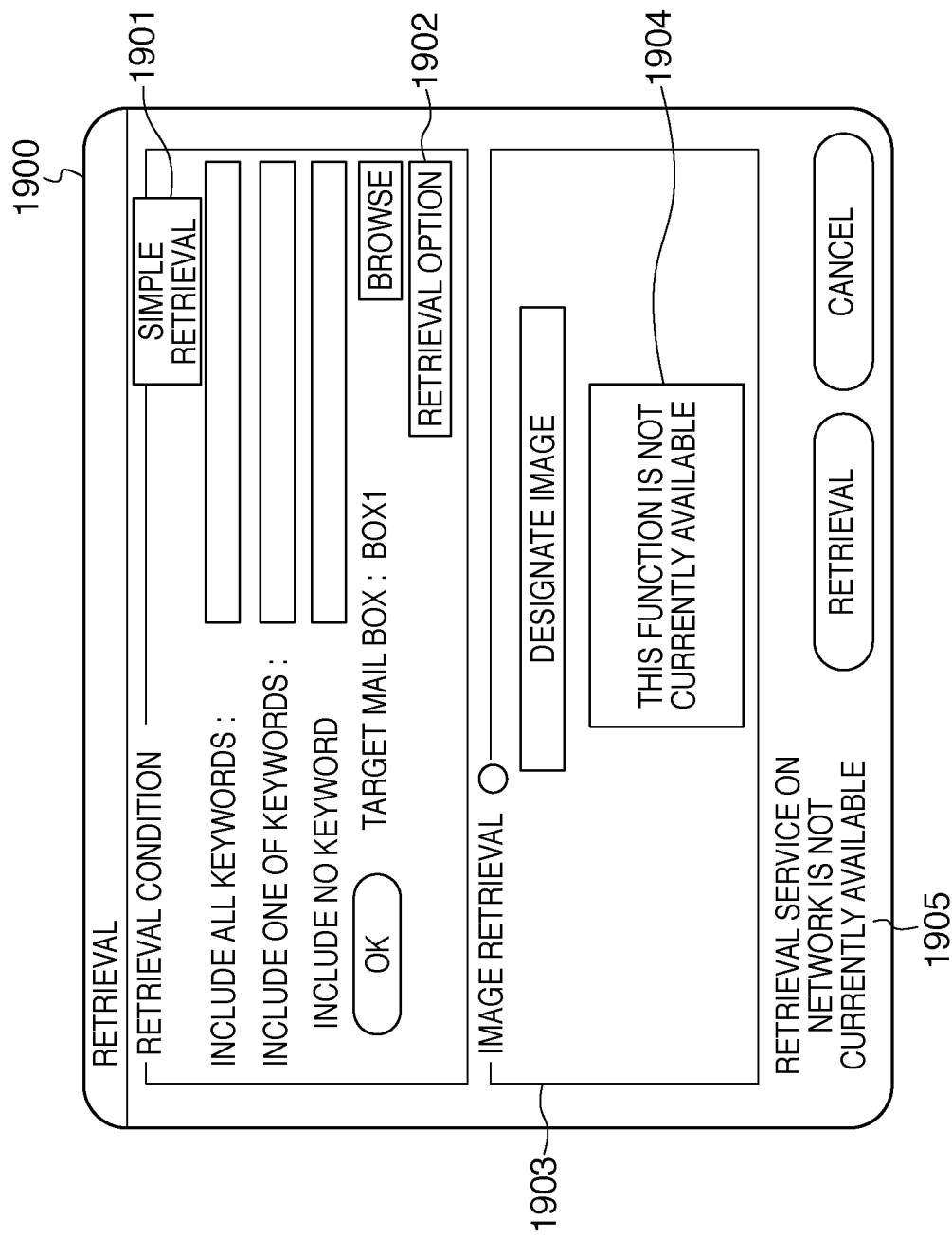
FIG. 19 is a view showing an example of a retrieval instruction screen which allows the user to use a simple retrieval process of the color MFP 1 according to the embodiment.

FIG. 19 shows an example of a retrieval instruction screen 1900 that allows the operator to use only a simple retrieval function.

The configuration of the retrieval instruction screen is the same as that of the retrieval instruction screen 1800 that allows the operator to use the high-level retrieval function, but some functions are restricted on the screen 1900. The differences between the retrieval instruction screen 1900 and the retrieval instruction screen 1800 that allows the operator to use the high-level retrieval function will be described below.

A field 1901 indicates that a simple retrieval function implemented in the color MFP 1 is available when a retrieval service on the network is not available. Since the retrieval function on the network is not available, a retrieval option setting button 1902 is grayed out. Also, since the image retrieval is not available, an image retrieval setting area 1903 is grayed out, and a message indicating that this function is not available is displayed on an area 1904. Furthermore, a message indicating that the retrieval service on the network is not available is displayed on a field 1905.

(Example of Retrieval Result Screen)

Figure 20:
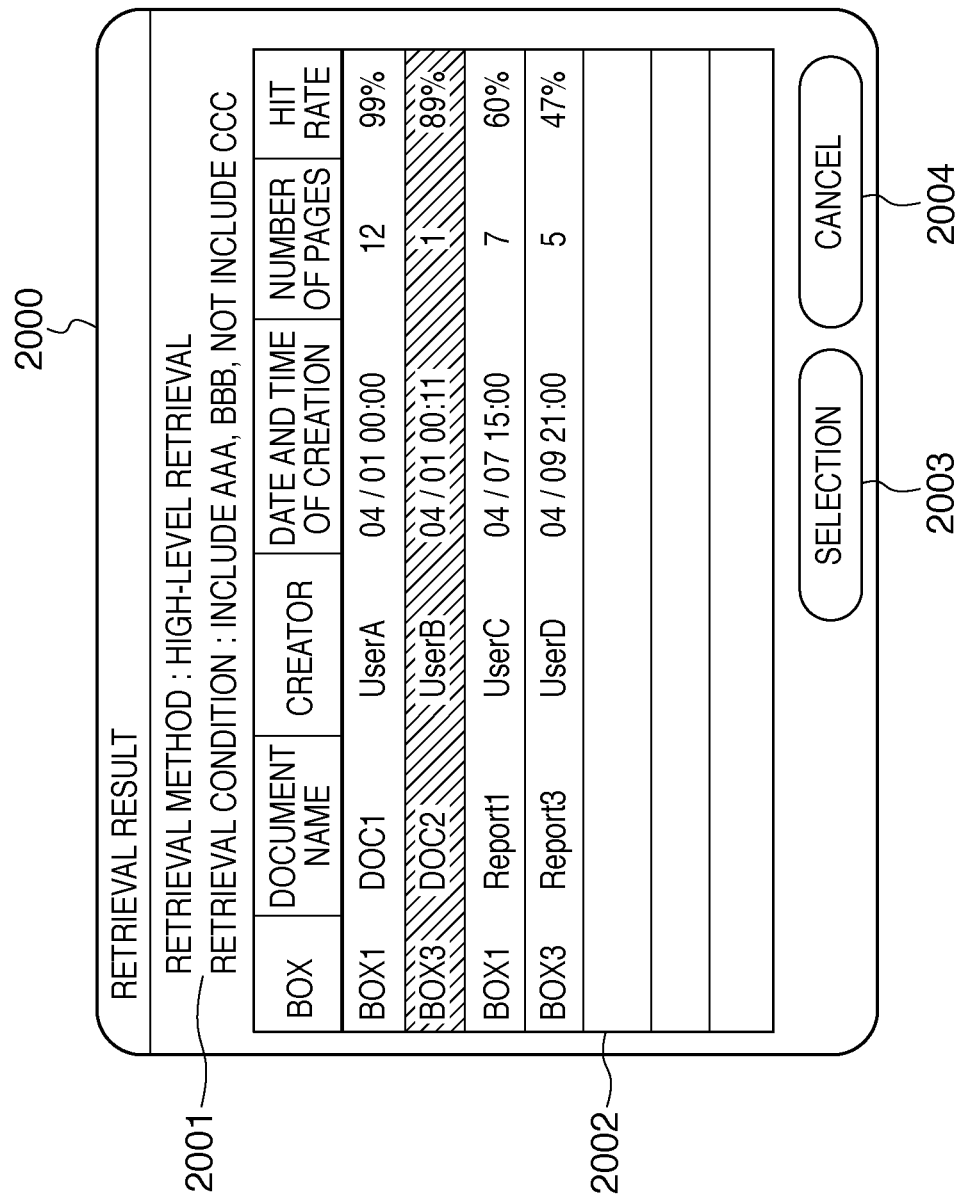
FIG. 20 is a view showing an example of a retrieval result screen of the color MFP 1 according to the embodiment.

FIG. 20 shows an example of a retrieval result screen displayed by the retrieval instruction UI process.

In FIG. 20, reference numeral 2000 denotes an example of a retrieval result screen that displays retrieval results from a retrieval server (corresponding to the color MFP 2 in this example).

A field 2001 displays retrieval conditions set by the operator on the retrieval screen. An area 2002 displays a list of retrieval results notified from the retrieval server. The display order matches that the results are notified from the retrieval server, and sorting of the retrieval results is made on the retrieval server side. The example of FIG. 20 shows a case in which the operator instructs the sorting of the retrieval results based on hit rates using the retrieval option setting from the displayed screen notified from the retrieval server, and the retrieval results appear in descending order of hit rate.

A button 2004 is pressed to cancel the retrieval result display. When the operator presses this button, the retrieval instruction screen before display of the retrieval result display screen is displayed again. A button 2003 is pressed to transit the current screen to a process selection screen. When the operator selects a document from the retrieval results and presses this button, the current screen transits to the process selection screen that allows the operator to select a process candidate for the selected document. From the process selection screen, the operator can select various processes such as a print process, a preview display, an image transmission process, and an image edition process for the selected document.

(Sequence Example of Retrieval Instruction UI Process)

Figure 17:
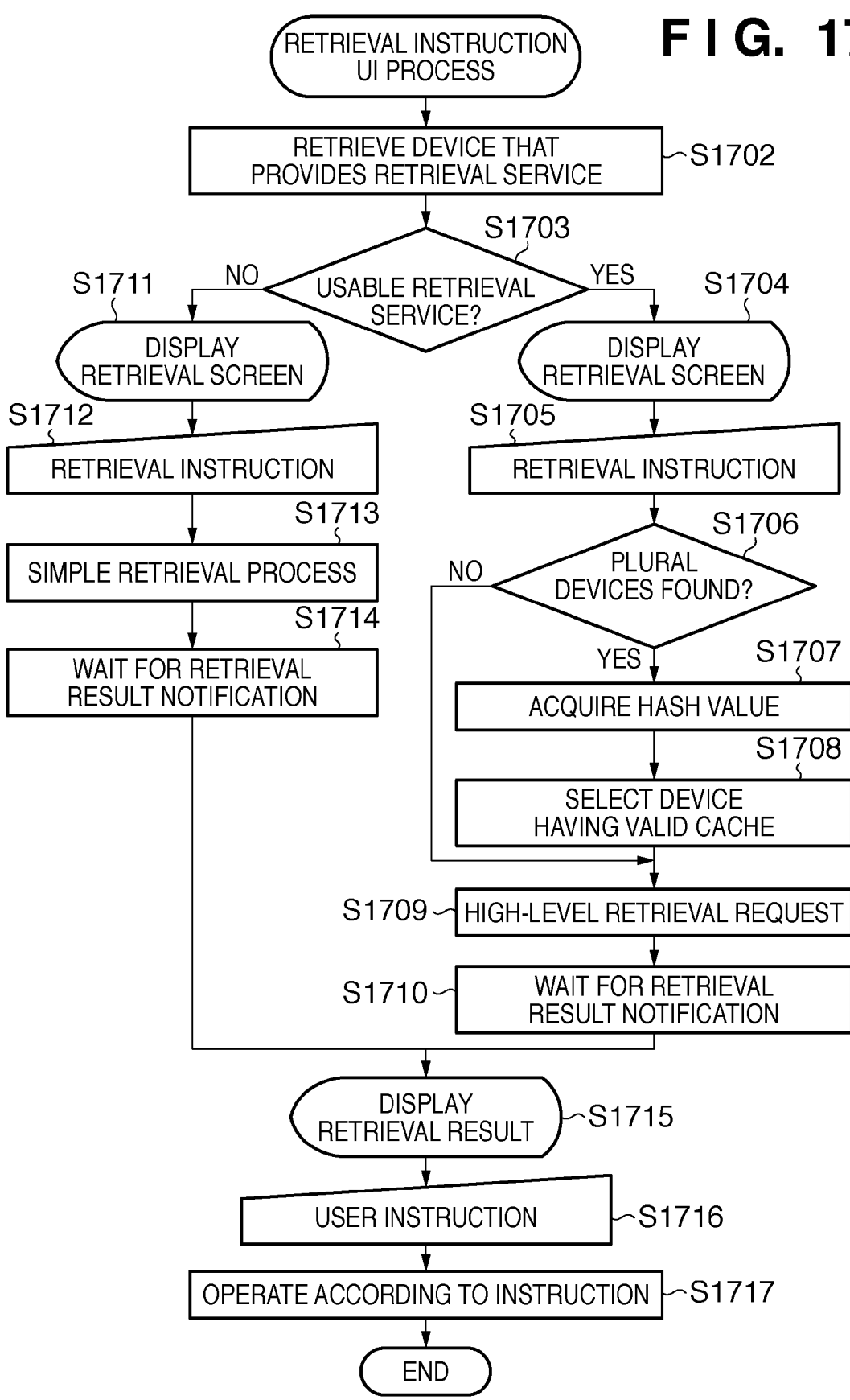
FIG. 17 is a flowchart showing an example of the sequence of a retrieval instruction UI process of the color MFP 1 according to the embodiment.

FIG. 17 is a flowchart showing the operation sequence of the retrieve designation UI processing unit 320 of the color MFP 1 according to this embodiment. This flowchart is executed by CPU 205 in FIG. 3.

Upon launching the retrieve designation UI processing unit 320, the unit 320 retrieves a device that provides a retrieval service on the LAN 10 in step S1702. The service is retrieved by sending an inquiry to a UDDI registry server (not shown) on the LAN 10. As a result of the inquiry, a plurality of devices may often be retrieved. In place of issuing an inquiry to the UDDI registry server, a list of devices which provide a retrieval service may be registered in advance.

In step S1703, the retrieve designation UI processing unit 320 sends an inquiry as to whether or not the retrieval service is usable to each device retrieved in step S1702 using a SOAP message. If the retrieval service is not usable in all retrieved devices, or if no device that provides a retrieval service is found, the process advances to step S1711; if a retrieval service is usable in at least one device, the process advances to step S1704.

In step S1704, the retrieve designation UI processing unit 320 displays the retrieval instruction screen that allows the operator to use the high-level retrieval function (see FIG. 18).

If the operator presses the retrieval instruction button 1810 on the retrieval instruction screen 1800 in FIG. 18 (S1705), the process advances to step S1706.

The retrieve designation UI processing unit 320 determines in step S1706 if the retrieval service is usable in a plurality of devices as a result of the inquiry of the availability of the retrieval service in step S1703. If the retrieval service is usable in the plurality of devices, the process advances to step S1707; if it is usable in only one device, the process jumps to step S1709.

In step S1707, the retrieve designation UI processing unit 320 notifies each device whose retrieval service is usable of a metadata directory corresponding to a mailbox selected as a retrieval target using a SOAP message, and requests it to send a hash value. Upon reception of a hash value sent from each device, the process advances to step S1708.

In step S1708, the retrieve designation UI processing unit 320 compares the received hash values with that of the self device. If a device whose hash value matches that of the self device is found, the unit 320 selects that device as a retrieval request target device. If there is no device whose hash value matches that of the self device, the unit 320 selects an arbitrary one of the devices whose retrieval service is usable. In this embodiment, selecting a retrieval process request destination based on whether or not the metadata cache is valid will be referred to as a fourth request destination selection unit.

In step S1709, the retrieve designation UI processing unit 320 issues a retrieval request to the device selected in step S1708 or the only one device whose retrieval service is usable (NO in step S1706). The unit 320 issues this retrieval request by notifying the device of the retrieval conditions set on the retrieval instruction screen 1800 and the path of the metadata directory corresponding to the retrieval target mailbox using a SOAP message. When an image retrieval instruction is issued on the retrieval instruction screen 1800, the unit 320 also notifies the device of the path to a file of the retrieval target image.

In step S1710, the retrieve designation UI processing unit 320 waits for a notification of retrieval results from the device to which the retrieval request was issued. Upon reception of the notification of the retrieval results, the process advances to step S1715.

On the other hand, in step S1711 which is reached when it is determined in step S1703 that there is no device having a usable retrieval service on the network, the retrieve designation UI processing unit 320 displays the retrieval instruction screen 1900 that allows the operator to use only the simple retrieval function.

The operator instructs the conducting of a retrieval by setting the retrieval conditions and retrieval target mailbox on the retrieval instruction screen 1900 (S1712). Then, the retrieve designation UI processing unit 320 notifies the simple retrieval processing unit 321 of the retrieval conditions and a metadata directory corresponding to the retrieval target mailbox, thus executing a simple retrieval process (S1713).

In step S1714, the retrieve designation UI processing unit 320 waits for a notification of retrieval results from the simple retrieval processing unit 321. Upon reception of the notification of the retrieval results, the process advances to step S1715.

In step S1715, the retrieve designation UI processing unit 320 displays the retrieval result screen (the screen 2000 in case of the high-level retrieval) that displays a list of retrieval results received in step S1710 as a result of the high-level retrieval requested to the external device or in step S1714 as a result of the simple retrieval in the self device.

If the user selects a process using the selection button 2003 (S1716), the retrieve designation UI processing unit 320 executes the various processes designated by the user in step S1717, thus ending this processing.

<Retrieval Service by Color MFP 2>

Figure 21:
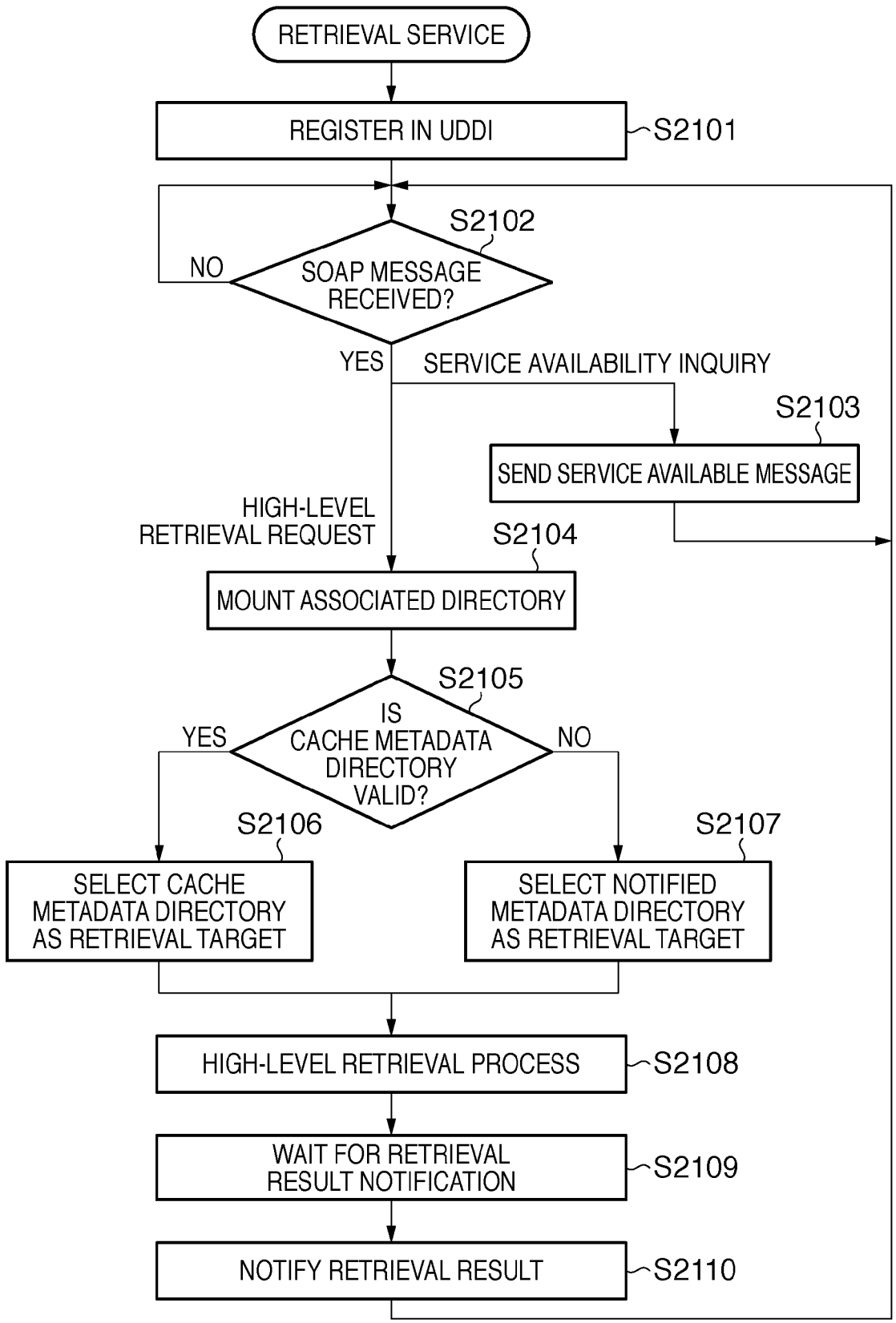
FIG. 21 is a flowchart showing an example of the sequence of a retrieval service of the color MFP 2 according to the embodiment.

FIG. 21 is a flowchart showing the operation sequence of the retrieval service unit 621 of the color MFP 2 according to this embodiment. This flowchart is executed by CPU 205 in FIG. 5.

Upon launching a retrieval service, the retrieval service unit 621 registers the retrieval service in a UDDI registry server (not shown) on the LAN 10 (S2101), and waits for reception of a SOAP message to that service (S2102).

Upon reception of a SOAP message in step S2102, the retrieval service unit 621 switches the process according to the message.

If the message is an inquiry about availability of a retrieval service, the retrieval service unit 621 sends a service available message to the device that issued the inquiry, in step S2103, and the process returns to step S2102 to wait for reception of a SOAP message.

If the message received in step S2102 is a retrieval request, the process advances to step S2104. In step S2104, the retrieval service unit 621 mounts a metadata directory included in the message under a directory "/net/device name/". Note that a device name included in the directory indicates the device that issued the retrieval request. For example, when the message from the color MFP 1 includes the path "/META/BOX1/job1" of the metadata directory, the retrieval service unit 621 can access that document file of the color MFP 1 by accessing "/net/color MFP 1/META/BOX1/job1". In step S2104, if the received retrieval request also includes an image retrieval request, the unit 621 mounts a directory including a file of the retrieval target image.

The retrieval service unit 621 determines in step S2105 if the metadata directory of the request source device (color MFP 1) as a retrieval target and a cache metadata directory in the self device are valid. If these directories are valid, the unit 621 selects the cache metadata directory as the retrieval target directory (S2106); otherwise, it selects the metadata directory of the request source device (S2107). Whether or not the cache metadata directory is valid is confirmed by checking the presence/absence of the cache metadata directory and comparing a hash value in metadata directory information included in each metadata directory. If the corresponding cache metadata directory exists, and if the hash value in the cache metadata directory matches that in the metadata directory of the request source device, the unit 621 determines that the cache metadata directory is valid.

In step S2108, the retrieval service unit 621 notifies the high-level retrieval processing unit 615 of the retrieval conditions and the path of the retrieval target directory included in the message received in step S2102, thus executing a high-level retrieval process. If the retrieval to be executed includes an image retrieval based on the notified retrieval conditions, the unit 621 also notifies the high-level retrieval processing unit 615 of the path to a file of the retrieval target image, which is also included in the message. In the high-level retrieval process, the high-level retrieval processing unit 615 retrieves metadata in the retrieval target directory under the notified retrieval conditions, and notifies the retrieval service unit 621 of a list of retrieval results.

In step S2109, the retrieval service unit 621 waits for a notification of the retrieval results from the high-level retrieval processing unit 615. Upon reception of the notification of the retrieval results, the retrieval service unit 621 notifies the retrieval request source device of the retrieval results using a SOAP message (S2110), and the process returns to step S2102 to wait for reception of a SOAP message.

According to this embodiment, the color MFP 1 cannot generate metadata for a document retrieval by itself, but it can generate metadata of documents stored in the mailboxes of the self device using the metadata generation service of the color MFP 2.

Since the metadata generation request process of the color MFP 1 is implemented as an expansion application, it can be downloaded as an additional function later on at the time of introduction of the color MFP 2, and can be executed.

The metadata generation request process of the color MFP 1 need not issue a metadata generation request simultaneously with generation of a document file even when the metadata generation service of the color MFP 2 is not ready to use. When the metadata generation service of the color MFP 2 is ready to use, the metadata generation request can be issued.

When the retrieval service of the color MFP 2 is available, the color MFP 1 can conduct a high-level retrieval of documents in the mailboxes of the self device using the high-level retrieval function of the color MFP 2. Furthermore, even when the retrieval service of the color MFP 2 is not available, the color MFP 1 can retrieve documents whose metadata have already been created using the simple retrieval process of the self device by itself.

When the cache metadata directory is valid, the color MFP 2 uses that directory. In this case, the color MFP 2 can execute the high-level retrieval process at high speed without accessing any metadata directory of the color MFP 1 via the network.

The color MFP 1 displays a list of documents whose metadata are not created in the retrieval target mailbox of the given device, thereby suggesting a possibility of documents which are not located in the retrieval to the operator.

Note that a device to which the color MFP 1 requests the metadata generation service and retrieval service is not limited to the color MFP 2, but it may be another MFP or server computer as long as it can provide these services.

In the first embodiment, the color MFP 1 executes the simple retrieval process of the self device when the retrieval service on the network is not valid. Alternatively, the operator may select whether to use the retrieval service on the network or the simple retrieval process.

The objects of the present invention can also be achieved as follows. That is, a storage medium (or recording medium) that records a program code of software that implements the functions of the aforementioned embodiments is supplied to a system or apparatus. Then, a computer (CPU or MPU) of that system or apparatus reads out and executes the program code stored in the storage medium.

In this case, the program code itself read out from the storage medium implements the functions of the aforementioned embodiments, and the storage medium that records the program code constitutes the present invention.

The present invention is not limited to a case in which the functions of the above-mentioned embodiments are implemented when the computer executes the readout program code. The present invention also includes a case in which an operating system (OS) or the like running on the computer executes some or all of actual processes based on an instruction of the program code, thereby implementing the functions of the aforementioned embodiments.

Furthermore, the program read out from the recording medium is written in a memory of a function expansion card or function expansion unit, which is inserted in or connected to the computer. After that, a CPU or the like equipped on that function expansion card or unit executes some or all of actual processes. The present invention also includes a case in which the functions of the aforementioned embodiments are implemented by these processes.

When the present invention is applied to the storage medium, that storage medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2008-128792, filed May 15, 2008, which is hereby incorporated by reference herein in its entirety.

What is claimed is:

1. A method of controlling an image processing apparatus, comprising:
   a receiving step of receiving PDL data via a network;
   an image data generating step of generating image data based on the received PDL data;
   a storage step of storing the received PDL data, the generated image data and a document file in a storage unit, the document file including a path to the stored PDL data and a path to the stored image data;
   a metadata generation request step of detecting, from the storage unit, a document file whose metadata is not created, and requesting, via the network, an other apparatus to generate metadata associated with the detected document file by notifying the other apparatus of a path to the detected document file and a path to a metadata directory,
   wherein the other apparatus is different from the image processing apparatus, and
   wherein the other apparatus mounts a first directory including the detected document file and the metadata directory based on the notified path to the detected document file and the notified path to the metadata directory, and generates, in the mounted metadata directory, the metadata associated with the detected document file based on the path to the stored PDL data and the path to the stored image data which are included in the detected document file included in the mounted first directory; and
   a metadata storage step of storing the metadata generated by the other apparatus in the metadata directory of the storage unit, the stored metadata being associated with the detected document file whose metadata was requested in the metadata generation request step.

2. A non-transitory computer-readable storage medium storing a program instructing a computer to execute the steps of a method of controlling an image processing apparatus according to claim 1.

3. The method according to claim 1, further comprising:
   a retrieval step of retrieving image data in the storage unit using the stored metadata.

4. The method according to claim 1, wherein the generated metadata includes character information acquired as a result of a character recognition processing for the image data obtained based on the path to the stored image data included in the detected document file.

5. The method according to claim 1, wherein the generated metadata includes the amount of an image characteristic acquired as a result of an image feature amount extraction processing for the image data obtained based on the path to the stored image data included in the detected document file.

6. The method according to claim 1, wherein the generated metadata includes character information acquired as a result of a PDL analysis processing for the PDL data obtained based on the path to the PDL data included in the detected document file.

7. An image processing apparatus, comprising:
   a receiving unit configured to receive PDL data via a network;
   an image data generation unit configured to generate image data based on the received PDL data;
   a storage unit configured to store the received PDL data, the generated image data and a document file, the document file including a path to the stored PDL data and a path to the stored image data;
   a metadata generation request unit configured to detect, from the storage unit, a document file whose metadata is not created, and to request, via the network, an other apparatus to generate metadata associated with the detected document file by notifying the other apparatus of a path to the detected document file and a path to a metadata directory, wherein the other apparatus is different from the image processing apparatus, and wherein the other apparatus mounts a first directory including the detected document file and the metadata directory based on the notified path to the detected document file and the notified path to the metadata directory, and generates, in the mounted metadata directory, the metadata associated with the detected document file based on the path to the stored PDL data and the path to the stored image data which are included in the detected document file included in the mounted first directory; and a metadata storage unit configured to store the metadata generated by the other apparatus in the metadata directory of the storage unit, the metadata being associated with the detected document file whose metadata was requested by the metadata generation request unit.

8. The apparatus according to claim 7, further comprising:
a retrieval unit configured to retrieve image data in the storage unit using the stored metadata.

9. The apparatus according to claim 7, wherein the generated metadata includes character information acquired as a result of a character recognition processing for the image data obtained based on the path to the stored image data included in the detected document file.

10. The apparatus according to claim 7, wherein the generated metadata includes the amount of an image characteristic acquired as a result of an image feature amount extraction processing for the image data obtained based on the path to the stored image data included in the detected document file.

11. The apparatus according to claim 7, wherein the generated metadata includes character information acquired as a result of a PDL analysis processing for the PDL data obtained based on the path to the PDL data included in the detected document file.

* * * * *